(12) United States Patent
Yokoyama et al.

(10) Patent No.: US 12,348,064 B2
(45) Date of Patent: Jul. 1, 2025

(54) CONTROL DEVICE FOR MOBILE BODY, CONTROL METHOD THEREFOR, AND MOBILE BODY INCLUDING DETERMINING A FAILURE OF A SWITCHING UNIT WHEN NO ELECTRICAL LOAD IS CONNECTED

(71) Applicants: HONDA MOTOR CO., LTD., Tokyo (JP); FUJI ELECTRIC CO., LTD., Kawasaki (JP)

(72) Inventors: Shinichi Yokoyama, Wako (JP); Mitsuteru Yano, Tokyo (JP); Masahiko Sato, Tokyo (JP); Atsushi Kaneko, Suzuka (JP)

(73) Assignees: Honda Motor Co., Ltd, Tokyo (JP); Fuji Electric Co Ltd., Kawasaki (JP)

( * ) Notice: Subject to any disclaimer, the term of this patent is extended or adjusted under 35 U.S.C. 154(b) by 769 days.

(21) Appl. No.: 17/483,252

(22) Filed: Sep. 23, 2021

(65) Prior Publication Data

US 2022/0102990 A1 Mar. 31, 2022

(30) Foreign Application Priority Data

Sep. 28, 2020 (JP) .................................. 2020-161876

(51) Int. Cl.
*H02J 7/00* (2006.01)
*B60L 1/00* (2006.01)
(Continued)

(52) U.S. Cl.
CPC .............. *H02J 7/0036* (2013.01); *B60L 1/00* (2013.01); *B60L 1/006* (2013.01); *B60L 53/14* (2019.02);
(Continued)

(58) Field of Classification Search
CPC ...... H02J 7/0036; H02J 7/0029; H02J 7/0063; H02J 7/0068; H02J 7/02; H02J 2207/20;
(Continued)

(56) References Cited

U.S. PATENT DOCUMENTS 9,896,047 B2 2/2018 Mori
10,416,234 B2 * 9/2019 Zhou ...................... B60L 50/60
(Continued)

FOREIGN PATENT DOCUMENTS

CN 103858297 A 6/2014
CN 111688492 A 9/2020
(Continued)

OTHER PUBLICATIONS

Office Action dated Oct. 25, 2022 issued over the corresponding Japanese Patent Application No. 2020-161876 with the English translation thereof.
(Continued)

*Primary Examiner* — Richard Isla
*Assistant Examiner* — Manuel Hernandez
(74) *Attorney, Agent, or Firm* — Carrier, Shende & Associates P.C.; Joseph P. Carrier; Jeffrey T. Gedeon

(57) ABSTRACT

A control device for a mobile body is equipped with a switching unit configured to switch a conductive path between a charging and electrical power supplying unit, a charging connector, and an electrical power supplying connector, a connection determination unit configured to determine whether or not an electrical load is connected to the electrical power supplying connector, a failure determination unit configured to execute a failure determination to determine a failure of the switching unit based on a conductive state when the conductive path is switched, and a control unit configured to limit execution of the failure determination by the failure determination unit, in the case
(Continued)

it is determined by the connection determination unit that the electrical load is connected to the electrical power supplying connector.

6 Claims, 7 Drawing Sheets

(51) Int. Cl.

| | | |
|---|---|---|
| *B60L 53/14* | (2019.01) | |
| *B60L 53/30* | (2019.01) | |
| *B60L 53/62* | (2019.01) | |
| *B60R 16/03* | (2006.01) | |
| *B60R 16/033* | (2006.01) | |
| *H02J 7/02* | (2016.01) | |
| *B60L 3/00* | (2019.01) | |
| *B60L 55/00* | (2019.01) | |

(52) U.S. Cl.
CPC ............ *B60L 53/305* (2019.02); *B60L 53/62* (2019.02); *B60R 16/03* (2013.01); *B60R 16/033* (2013.01); *H02J 7/0029* (2013.01); *H02J 7/0063* (2013.01); *H02J 7/0068* (2013.01); *H02J 7/02* (2013.01); *B60L 3/0069* (2013.01); *B60L 55/00* (2019.02); *H02J 2207/20* (2020.01); *H02J 2310/40* (2020.01)

(58) Field of Classification Search
CPC ........ H02J 2310/40; B60L 1/00; B60L 1/006; B60L 53/14; B60L 53/305; B60L 53/62; B60L 3/0069; B60L 55/00; B60R 16/03; B60R 16/033
USPC .......................... 320/127, 128, 137; 324/503
See application file for complete search history.

(56) References Cited

U.S. PATENT DOCUMENTS

| | | | |
|---|---|---|---|
| 2010/0246081 A1* | 9/2010 | Yano ................... | B60L 3/0069 |
| | | | 361/91.5 |
| 2014/0347769 A1 | 11/2014 | Kanda et al. | |
| 2014/0358365 A1* | 12/2014 | Iwagami ................ | B60T 1/10 |
| | | | 701/34.4 |
| 2015/0241500 A1 | 8/2015 | Mochizuki et al. | |
| 2016/0236633 A1* | 8/2016 | Mori ..................... | G01R 31/40 |
| 2020/0139837 A1* | 5/2020 | Motohira ............... | B60L 50/60 |
| 2020/0276908 A1* | 9/2020 | Lim ....................... | B60L 53/18 |
| 2020/0295660 A1 | 9/2020 | Oguma et al. | |

FOREIGN PATENT DOCUMENTS

| | | | |
|---|---|---|---|
| JP | 2004347423 A | * | 12/2004 |
| JP | 2013240191 A | * | 11/2013 |
| JP | 2014-075853 A | | 4/2014 |
| JP | 2014-193082 A | | 10/2014 |
| JP | 2014-193088 A | | 10/2014 |
| JP | 2016-152680 A | | 8/2016 |
| JP | 2019-092310 A | | 6/2019 |
| WO | 2012/050164 A1 | | 4/2012 |
| WO | 2014/041796 A1 | | 3/2014 |
| WO | WO-2014196376 A1 | * | 12/2014 ............ H02J 7/0029 |

OTHER PUBLICATIONS

Office Action dated Apr. 19, 2022 issued over the corresponding Japanese Patent Application No. 2020-161876 with the English translation thereof.

Office Action dated Jun. 26, 2023 issued in the corresponding Chinese Patent Application No. 202111144316.4 with the English translation thereof.

* cited by examiner

CONTROL DEVICE FOR MOBILE BODY, CONTROL METHOD THEREFOR, AND MOBILE BODY INCLUDING DETERMINING A FAILURE OF A SWITCHING UNIT WHEN NO ELECTRICAL LOAD IS CONNECTED

CROSS-REFERENCE TO RELATED APPLICATION

This application is based upon and claims the benefit of priority from Japanese Patent Application No. 2020-161876 filed on Sep. 28, 2020, the contents of which are incorporated herein by reference.

BACKGROUND OF THE INVENTION

Field of the Invention

The present invention relates to a control device for a mobile body, a control method therefor, and a mobile body.

Description of the Related Art

In JP 2013-240191 A, the diagnosis of a failure in a relay, on the basis of a detection value of a sensor that detects a voltage between power lines, is disclosed.

SUMMARY OF THE INVENTION

However, in the case that determination of the failure is simply carried out, an electric leakage may be erroneously detected.

An object of the present invention is to solve the aforementioned problem.

A control device for a mobile body according to one aspect of the present invention includes a charging and electrical power supplying unit configured to charge a battery provided in the mobile body using electrical power supplied from an electrical power source positioned externally of the mobile body via a charging connector, and configured to supply electrical power to an electrical load supplied from the battery via an electrical power supplying connector, a switching unit provided between the charging and electrical power supplying unit and the charging connector, and between the charging and electrical power supplying unit and the electrical power supplying connector, and configured to switch a conductive path between the charging and electrical power supplying unit, the charging connector, and the electrical power supplying connector, a connection determination unit configured to determine whether or not the electrical load is connected to the electrical power supplying connector, a failure determination unit configured to execute a failure determination to determine a failure of the switching unit based on a conductive state when the conductive path is switched, and a control unit configured to limit execution of the failure determination by the failure determination unit, in a case it is determined by the connection determination unit that the electrical load is connected to the electrical power supplying connector.

A mobile body according to another aspect of the present invention is equipped with the control device for the mobile body as described above.

In a method of controlling a control device for a mobile body according to another further aspect of the present invention, in which the control device is equipped with a charging and electrical power supplying unit configured to charge a battery provided in the mobile body using electrical power supplied from an electrical power source positioned externally of the mobile body via a charging connector, and configured to supply electrical power to an electrical load supplied from the battery via an electrical power supplying connector, and a switching unit provided between the charging and electrical power supplying unit and the charging connector, and between the charging and electrical power supplying unit and the electrical power supplying connector, and configured to switch a conductive path between the charging and electrical power supplying unit, the charging connector, and the electrical power supplying connector, the method includes determining whether or not the electrical load is connected to the electrical power supplying connector, in the determining, in a case it is determined that the electrical load is not connected to the electrical power supplying connector, switching a conductive path between the charging and electrical power supplying unit, the charging connector, and the electrical power supplying connector, and executing a failure determination to determine a failure of the switching unit based on a conductive state when the conductive path is switched, and in the determining, in a case it is determined that the electrical load is connected to the electrical power supplying connector, limiting execution of the failure determination.

According to the present invention, there are provided the control device for the mobile body that is capable of accurately carrying out a failure determination with respect to a switching unit while preventing erroneous detection of electric leakage, as well as the control method therefor, and the mobile body that is equipped with the control device for the mobile body.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Embodiment

Figure 1:
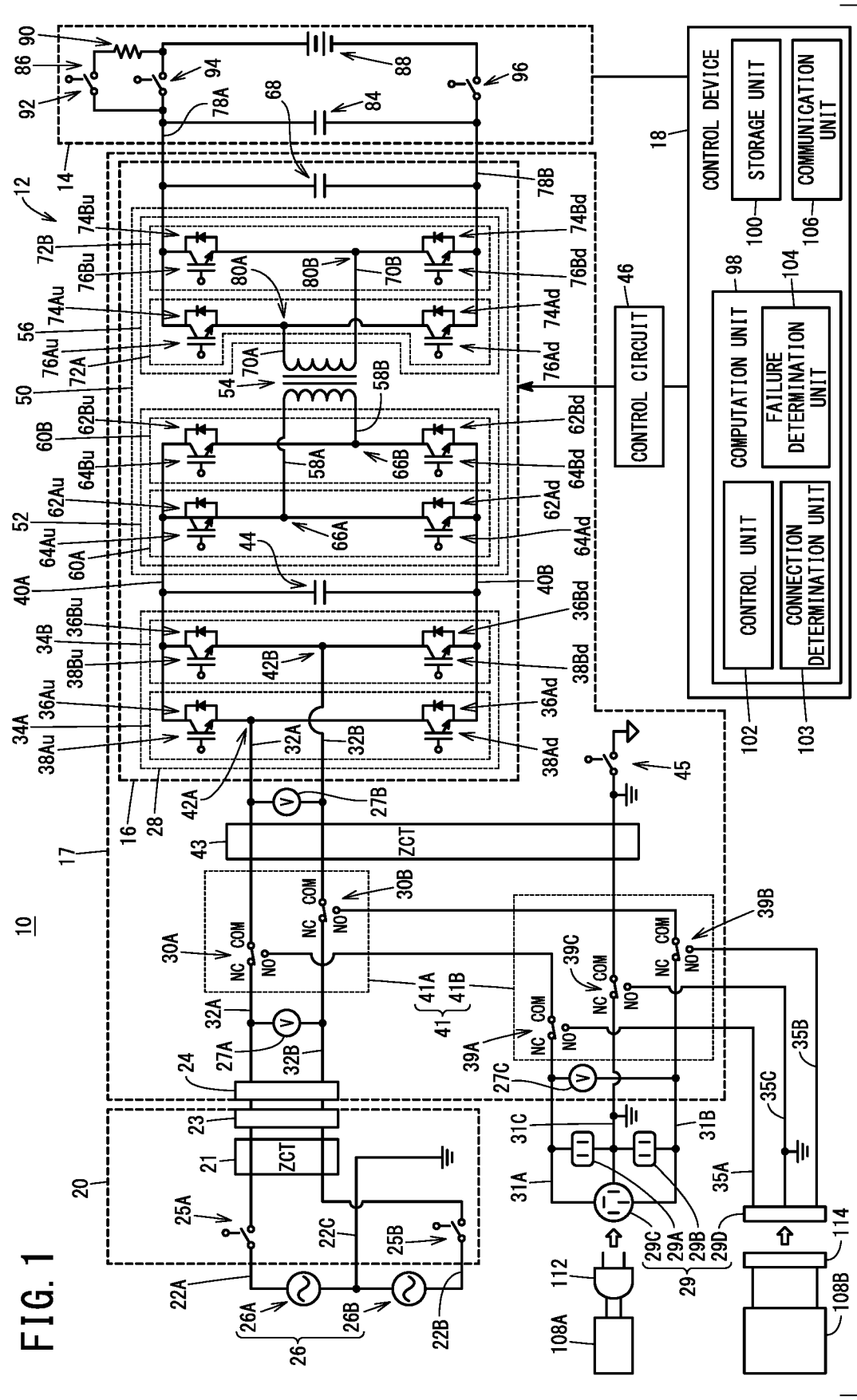
FIG. 1 is a block diagram showing a mobile body equipped with a control device for the mobile body according to an embodiment.

A mobile body control device and a control method therefor according to an embodiment, as well as a mobile body according to an embodiment of the present invention will be described below with reference to the accompanying drawings. FIG. 1 is a block diagram showing a mobile body equipped with a control device for the mobile body according to a present embodiment. In this instance, an exemplary case will be described in which a mobile body 10 is a vehicle, although the mobile body 10 is not limited to being a vehicle. For example, the mobile body 10 may be a robot or the like.

As shown in FIG. 1, the mobile body 10 includes a control device 12 for the mobile body, and a rechargeable energy storage system (REESS: REchargeable Energy Storage System) 14. The control device 12 for the mobile body is capable of carrying out charging and supply of electrical power. The rechargeable energy storage system 14 is capable of storing electrical power. It should be noted that, although the mobile body 10 is also equipped with constituent elements other than these constituent elements, illustration of such other constituent elements is omitted herein.

The control device (charging/discharging device) 12 for the mobile body is equipped with a charging and electrical power supplying device 17 having a charging and electrical power supplying unit (charging/discharging unit) 16. The control device 12 for the mobile body is provided with a plurality of operation modes, and more specifically, a charging mode, an electrical power supplying mode, and a failure detection mode. The operation modes of the control device 12 for the mobile body can be determined by a control unit 102 to be described later. In the charging mode, the charging and electrical power supplying unit 16 is capable of charging a battery 88, to be described later, which is provided in the mobile body 10, using electrical power supplied from an electrical power source 26 positioned externally of the mobile body 10. More specifically, the charging and electrical power supplying unit 16 is capable of converting AC power supplied from an electrical power source device 20 positioned externally of the mobile body 10 into DC power, and is capable of charging the battery 88 provided in the mobile body 10. In the electrical power supplying mode, the charging and electrical power supplying unit 16 is capable of supplying electrical power to electrical loads 108A and 108B via electrical power supplying connectors 29 using the electrical power supplied from the battery 88. More specifically, the charging and electrical power supplying unit 16 is capable of converting the DC power supplied from the battery 88 into AC power, and supplying the AC power to the electrical loads 108A and 108B. When describing the electrical loads in general, the reference numeral 108 will be used, and when describing the individual electrical loads, the reference numerals 108A and 108B will be used. In the failure detection mode, a conductive path between the charging and electrical power supplying unit 16, a charging connector 24, and the electrical power supplying connectors 29 is switched, and a failure determination can be executed in which a failure of a switching unit 41 is determined based on a conductive state when the conductive path is switched.

When charging the battery 88 is carried out, the electrical power source device 20 positioned externally of the mobile body 10 is electrically connected to the charging and electrical power supplying device 17. As an example of the electrical power source device 20, there may be cited EVSE (Electric Vehicle Supply Equipment), although the electrical power source device 20 is not limited to such equipment. EVSE is defined by a charging cable that is used in vehicles such as plug-in hybrid vehicles and electric vehicles. The electrical power source device 20 is provided with functions to detect the state of the electrical power source device 20, the state of the mobile body 10, and the like. In addition, the electrical power source device 20 is further provided with a function to control charging.

The electrical power source device 20 may be supplied with AC power from the electrical power source 26. An AC voltage supplied from the electrical power source 26, for example, is on the order of 240 V, however, the present invention is not limited to this feature. The electrical power source 26 can be constituted from a first electrical power source 26A that supplies, for example, an AC power of 120 V, and a second electrical power source 26B that supplies, for example, an AC power of 120 V. One output of the first electrical power source 26A is connected to a power line (voltage line) 22A provided in the electrical power source device 20. Another output of the first electrical power source 26A, and one output of the second electrical power source 26B are grounded via a power line (neutral line) 22C provided in the electrical power source device 20. Another output of the second electrical power source 26B is connected to a power line (voltage line) 22B provided in the electrical power source device 20. The electrical power source device 20 is equipped with a connector 23, and more specifically, a charging connector. The AC power supplied from the electrical power source 26 can be supplied to the connector 23 via the power lines 22A and 22B. The mobile body 10 is equipped with the charging connector 24, and more specifically, an inlet. The charging connector 24 is connected to a plurality of power lines (plurality of first power lines) 32A and 32B provided between the charging connector 24 and the charging and electrical power supplying unit 16. When describing the power lines in general, the reference numeral 32 will be used, and when describing the individual power lines, the reference numerals 32A and 32B will be used. When charging the battery 88 is carried out, the connector 23 and the charging connector 24 can be connected.

Switches 25A and 25B are respectively provided in the pair of power lines 22A and 22B provided in the electrical power source device 20. As the switches 25A and 25B, for example, relay contacts or the like can be used, however, the switches 25A and 25B are not limited to this feature. When the switches 25A and 25B are in an OFF state, the AC power from the electrical power source 26 is not supplied to the charging and electrical power supplying unit 16. When the switches 25A and 25B are placed in an ON state, the AC power from the electrical power source 26 is supplied to the charging and electrical power supplying device 17 via the power lines 22A and 22B, the switches 25A and 25B, the connector 23, and the charging connector 24.

The electrical power source device 20 is equipped with a zero-phase current transformer, or stated otherwise, a ZCT (Zero-phase Current Transformer) 21. The ZCT 21 serves for detecting a ground fault current (earth fault current or leakage current). Stated otherwise, the ZCT 21 is a leakage current detector. The pair of power lines 22A and 22B connected to the electrical power source 26 penetrate through the ZCT 21, and are connected to the connector 23.

The mobile body 10 is equipped with mobile body interior electrical power supplying connectors 29A to 29C for supplying electrical power to the electrical load 108A in the interior of the mobile body 10. The mobile body interior electrical power supplying connectors 29A to 29C may be provided inside a compartment or vehicle cabin or the like of the mobile body 10. The mobile body interior electrical power supplying connectors 29A to 29C are connected to power lines 31A to 31C provided between the mobile body interior electrical power supplying connectors 29A to 29C and the charging and electrical power supplying unit 16. When describing the power lines in general, the reference numeral 31 will be used, and when describing the individual power lines, the reference numerals 31A to 31C will be used. The power lines 31A to 31C constitute second power lines in combination with power lines 35A to 35C, to be described later. One power source terminal of the mobile body interior electrical power supplying connector 29A, and one power source terminal of the mobile body interior electrical power supplying connector 29C are connected to the power line (voltage line) 31A. Another power source terminal of the mobile body interior electrical power supplying connector 29A, one power source terminal of the mobile body interior electrical power supplying connector 29B, and a ground terminal of the mobile body interior electrical power supplying connector 29C can be grounded via the power line (neutral line, ground line) 31C. Another power source terminal of the mobile body interior electrical power supplying connector 29B, and another power source terminal of the mobile body interior electrical power supplying connector 29C are connected to the power line (voltage line) 31B.

When supply of electrical power is carried out with respect to the electrical load 108A positioned in the interior of the mobile body 10, the electrical load 108A is connected to the mobile body interior electrical power supplying connectors 29A to 29C provided in the mobile body 10. More specifically, a connector (outlet plug) 112 provided on the electrical load 108A is connected to the mobile body interior electrical power supplying connectors 29A to 29C.

The mobile body 10 is equipped with a mobile body exterior electrical power supplying connector 29D for supplying electrical power to an electrical load 108B located at the exterior (externally) of the mobile body 10. The electrical power supplying connectors 29 are constituted by the mobile body interior electrical power supplying connectors 29A to 29C and the mobile body exterior electrical power supplying connector 29D. The mobile body exterior electrical power supplying connector 29D is connected to power lines 35A to 35C provided between the mobile body exterior electrical power supplying connector 29D and the charging and electrical power supplying unit 16. When describing the power lines in general, the reference numeral 35 will be used, and when describing the individual power lines, the reference numerals 35A to 35C will be used. The power lines 35A to 35C constitute second power lines in combination with the above-described power lines 31A to 31C.

One power source terminal of the mobile body exterior electrical power supplying connector 29D is connected to the power line (voltage line) 35A. Another power source terminal of the mobile body exterior electrical power supplying connector 29D is connected to the power line (voltage line) 35B. A ground terminal of the mobile body exterior electrical power supplying connector 29D can be grounded via the power line (ground line) 35C. The mobile body exterior electrical power supplying connector 29D, for example, is a connector unit that conforms to the United States NEMA (National Electrical Manufacturers Association) standard, although the connector is not limited to this feature. The mobile body exterior electrical power supplying connector 29D can be used to supply backup power to a house or the like in the event of a power failure or the like, however, the present invention is not limited to this feature. The mobile body exterior electrical power supplying connector 29D is provided with a function of detecting whether or not a connector 114, to be described later, is connected (fitted) to the mobile body exterior electrical power supplying connector 29D. More specifically, the mobile body exterior electrical power supplying connector 29D is provided with a function of detecting whether or not the electrical load 108B, to be described later, is connected to the mobile body exterior electrical power supplying connector 29D. The electrical load 108B, for example, is an electrical load provided in a house or the like, although the electrical load is not limited to this feature. Because the mobile body exterior electrical power supplying connector 29D is provided with the function of detecting whether or not the electrical load 108B is connected thereto, it is possible to suppress movement of the mobile body 10 from being initiated in a state in which the connector 114 is connected to the mobile body exterior electrical power supplying connector 29D.

Moreover, in this instance, although a case is described in which a function of detecting whether or not the electrical loads 108 are connected to the mobile body interior electrical power supplying connectors 29A to 29C is not provided in the mobile body interior electrical power supplying connectors 29A to 29C, the present invention is not limited to this feature. A function of detecting whether or not the electrical loads 108 are connected to the mobile body interior electrical power supplying connectors 29A to 29C may be provided in the mobile body interior electrical power supplying connectors 29A to 29C.

When supply of electrical power is carried out with respect to the electrical load 108B positioned externally of the mobile body 10, the electrical load 108B is electrically connected to the charging and electrical power supplying unit 16. More specifically, a connector (outlet plug) 114 provided on the electrical load 108B is connected to the mobile body exterior electrical power supplying connector 29D provided in the mobile body 10. The connector 114, for example, is a connector unit that conforms to the United States NEMA standard, although the connector 114 is not limited to this feature.

Switches (changeover switches) 30A and 30B are provided respectively in the power lines 32A and 32B provided in the charging and electrical power supplying device 17. A first switching unit 41A is constituted by the switch 30A and the switch 30B. When describing the switches in general, the reference numeral 30 will be used, and when describing the individual switches, the reference numerals 30A and 30B will be used.

Switches (changeover switches) 39A to 39C are provided respectively in the power lines 31A to 31C provided in the charging and electrical power supplying device 17. A second switching unit 41B is constituted by the switch 39A, the switch 39B, and the switch 39C. When describing the switches in general, the reference numeral 39 will be used, and when describing the individual switches, the reference numerals 39A to 39C will be used.

Switching units 41 are constituted by the first switching unit 41A and the second switching unit 41B. The switching units 41 are provided between the charging and electrical power supplying unit 16 and the charging connector 24, together with being provided between the charging and electrical power supplying unit 16 and the electrical power supplying connectors 29. The switching units 41 are capable of switching a conductive path between the charging and electrical power supplying unit 16, the charging connector 24, and the electrical power supplying connectors 29. The switching units 41 are capable of switching the conductive path in a manner so that one from among the mobile body interior electrical power supplying connectors 29A to 29C and the mobile body exterior electrical power supplying connector 29D can be made conductive with the charging and electrical power supplying unit 16.

As the switches 30A and 30B, for example, relay contacts or the like can be used, however, the switches 30A and 30B are not limited to this feature. A contact specification (contact type) of the switches 30A and 30B is a c-contact. A common terminal COM of the switch 30A is connected to the charging and electrical power supplying unit 16 via the power line 32A. A common terminal COM of the switch 30B is connected to the charging and electrical power supplying unit 16 via the power line 32B. For example, a normally closed terminal NC of the switch 30A is connected to the charging connector 24 via the power line 32A. For example, a normally closed terminal NC of the switch 30B is connected to the charging connector 24 via the power line 32B. For example, a normally open terminal NO of the switch 30A is connected to a later-described common terminal COM of the switch 39A via the power line 31A. For example, a normally open terminal NO of the switch 30B is connected to a later-described common terminal COM of the switch 39B via the power line 31B.

When the switches 30A and 30B are set respectively in a state in which the common terminals COM and the normally closed terminals NC are connected, the charging and electrical power supplying unit 16 is connected to the charging connector 24 via the power lines 32A and 32B. When the switches 30A and 30B are set respectively in a state in which the common terminals COM and the normally open terminals NO are connected, the charging and electrical power supplying unit 16 is connected to the electrical power supplying connectors 29 via the power lines 32A and 32B and the power lines 31A and 31B. In this manner, the first switching unit 41A is capable of switching the conductive state between the charging connector 24 and the charging and electrical power supplying unit 16.

Moreover, in the above description, although an exemplary case has been described in which the normally closed terminals NC of the switches 30A and 30B are connected to the charging connector 24 respectively via the power lines 32A and 32B, the present invention is not limited to this feature. Further, in the above description, although an exemplary case has been described in which the normally open terminals NO of the switches 30A and 30B are connected to the electrical power supplying connectors 29 respectively via the power lines 31A and 31B, the present invention is not limited to this feature. The normally open terminals NO of the switches 30A and 30B may be connected to the charging connector 24 respectively via the power lines 32A and 32B, and the normally closed terminals NC of the switches 30A and 30B may be connected to the electrical power supplying connectors 29 respectively via the power lines 31A and 31B.

As the switches 39A to 39C, for example, relay contacts or the like can be used, however, the switches 39A to 39C are not limited to this feature. A contact specification of the switches 39A to 39C is a c-contact. For example, a common terminal COM of the switch 39A is connected to an NO contact of the switch 30A via the power line 31A. For example, a common terminal COM of the switch 39B is connected to an NO contact of the switch 30B via the power line 31B. A common terminal COM of the switch 39C is grounded via the power line (ground line) 31C. For example, a normally closed terminal NC of the switch 39A is connected, via the power line 31A, to one of the power source terminals of the mobile body interior electrical power supplying connector 29A, and one of the power source terminals of the mobile body interior electrical power supplying connector 29C. For example, a normally closed terminal NC of the switch 39C is connected, via the power line 31C, to another one of the power source terminals of the mobile body interior electrical power supplying connector 29A, and one of the power source terminals of the mobile body interior electrical power supplying connector 29B, and a ground terminal of the mobile body interior electrical power supplying connector 29C. For example, a normally closed terminal NC of the switch 39B is connected, via the power line 31B, to another one of the power source terminals of the mobile body interior electrical power supplying connector 29B, and another one of the power source terminals of the mobile body interior electrical power supplying connector 29C. For example, a normally open terminal NO of the switch 39A is connected, via the power line 35A, to one of the power source terminals of the mobile body exterior electrical power supplying connector 29D. For example, a normally open terminal NO of the switch 39B is connected, via the power line 35B, to another one of the power source terminals of the mobile body exterior electrical power supplying connector 29D. For example, a normally open terminal NO of the switch 39C is connected, via the power line 35C, to the ground terminal of the mobile body exterior electrical power supplying connector 29D.

In the case that the switches 30A and 30B are set respectively in a state in which the common terminal COM and the normally open terminal NO are connected, together with the switches 39A to 39C being set respectively in a state in which the common terminal COM and the normally closed terminal NC are connected, the following situation takes place. More specifically, in such a case, the charging and electrical power supplying unit 16 is connected to the mobile body interior electrical power supplying connectors 29A to 29C via the power lines 32A and 32B and the power lines 31A and 31B. When the switches 30A and 30B are set respectively in a state in which the common terminal COM and the normally open terminal NO are connected, together with the switches 39A to 39C being set respectively in a state in which the common terminal COM and the normally open terminal NO are connected, the following situation takes place. More specifically, the charging and electrical power supplying unit 16 is connected to the mobile body exterior electrical power supplying connector 29D via the power lines 32A and 32B, the power lines 31A and 31B, and the power lines 35A and 35B. In the foregoing manner, in the second switching unit 41B, when the first switching unit 41A is switched in a manner so that the charging connector 24 and the charging and electrical power supplying unit 16 become non-conductive, the conductive state can be switched in a manner so that one from among the mobile body interior electrical power supplying connectors 29A to 29C and the mobile body exterior electrical power supplying connector 29D is made conductive with the charging and electrical power supplying unit 16.

The charging and electrical power supplying device 17 is equipped with a ZCT 43. The power lines 32A and 32B and the power line 31C penetrate through the ZCT 43.

The power line (ground line) 31C may be electrically connected via a switch 45 to a non-illustrated body of the mobile body 10.

The charging and electrical power supplying device 17 is provided with voltage sensors (detection units) 27A, 27B, and 27C. One input terminal of the voltage sensor 27A is connected to the power line 32A at a location between the charging connector 24 and the first switching unit 41A. Another input terminal of the voltage sensor 27A is connected to the power line 32B at a location between the charging connector 24 and the first switching unit 41A. The voltage sensor 27A is capable of detecting a voltage between the power lines 32A and 32B at a location between the charging connector 24 and the first switching unit 41A. One input terminal of the voltage sensor 27B is connected to the power line 32A at a location between the first switching unit 41A and the charging and electrical power supplying unit 16. Another input terminal of the voltage sensor 27B is connected to the power line 32B at a location between the first switching unit 41A and the charging and electrical power supplying unit 16. The voltage sensor 27B is capable of detecting a voltage between the power lines 32A and 32B at a location between the first switching unit 41A and the charging and electrical power supplying unit 16. One input terminal of the voltage sensor 27C is connected to the power line 31A at a location between the electrical power supplying connectors 29 and the second switching unit 41B. Another input terminal of the voltage sensor 27C is connected to the power line 31B at a location between the electrical power supplying connectors 29 and the second switching unit 41B. The voltage sensor 27C is capable of detecting a voltage between the power lines 31A and 31B at a location between the electrical power supplying connectors 29 and the second switching unit 41B.

The charging and electrical power supplying unit 16 comprises a power conversion unit (first power conversion unit) 28, a smoothing capacitor (connector side smoothing capacitor) 44, a power conversion unit (second power conversion unit) 50, and a smoothing capacitor (battery side smoothing capacitor) 68. An AC/DC conversion unit that mutually converts the AC power on the side of the charging connector 24 and the DC power on the side of the battery 88 is constituted by the power conversion unit 28, the smoothing capacitor 44, the power conversion unit 50, and the smoothing capacitor 68.

The AC power supplied from the electrical power source device 20 can be supplied to the power conversion unit 28 via the power lines 32A and 32B. In the charging mode, the power conversion unit 28 is capable of converting the AC power supplied from the electrical power source device 20 into DC power, and supplying the DC power to the side of the smoothing capacitor 44. Further, in the electrical power supplying mode, the power conversion unit 28 is capable of converting the DC power supplied from the side of the smoothing capacitor 44 into AC power, and supplying the AC power to the side of the electrical power supplying connectors 29.

The power conversion unit 50 is equipped with a conversion unit 52, an isolation transformer 54, and a conversion unit 56. The power conversion unit 50 is capable of transferring and receiving electrical power via the isolation transformer 54. DC power supplied from the side of the smoothing capacitor 44 positioned on the side of the charging connector 24 with respect to the isolation transformer 54 can be converted into AC power by the conversion unit 52, and elevated or boosted by the isolation transformer 54. The AC power elevated by the isolation transformer 54 can be converted into DC power by the conversion unit 56, and supplied to the side of the smoothing capacitor 68 positioned on the side of the battery 88 with respect to the isolation transformer 54. Further, the DC power supplied from the side of the smoothing capacitor 68 positioned on the side of the battery 88 with respect to the isolation transformer 54 can be converted into AC power by the conversion unit 56, and stepped down by the isolation transformer 54. The AC power stepped down by the isolation transformer 54 can be converted into DC power by the conversion unit 52, and supplied to the side of the smoothing capacitor 44.

The power conversion unit 28 is equipped with power element units 34A and 34B corresponding to the pair of power lines 32A and 32B, respectively.

The power element unit 34A corresponding to the power line 32A is equipped with a diode 36Au on the side of an upper arm, a diode 36Ad on the side of a lower arm, a switching element (semiconductor switching element) 38Au on the side of the upper arm, and a switching element 38Ad on the side of the lower arm.

The power element unit 34B corresponding to the power line 32B is equipped with a diode 36Bu on the side of an upper arm, a diode 36Bd on the side of a lower arm, a switching element 38Bu on the side of the upper arm, and a switching element 38Bd on the side of the lower arm.

When describing the diodes on the side of the upper arm in general, the reference numeral $36u$ will be used, and when describing the individual diodes on the side of the upper arm, the reference numerals 36Au and 36Bu will be used. Further, when describing the diodes on the side of the lower arm in general, the reference numeral $36d$ will be used, and when describing the individual diodes on the side of the lower arm, the reference numerals 36Ad and 36Bd will be used.

When describing the switching elements in general, the reference numeral 38 will be used, and when describing the individual switching elements, the reference numerals 38Au, 38Ad, 38Bu, and 38Bd will be used. Further, when describing the switching elements on the side of the upper arm in general, the reference numeral $38u$ will be used, and when describing the individual switching elements on the side of the upper arm, the reference numerals 38Au and 38Bu will be used. Further, when describing the switching elements on the side of the lower arm in general, the reference numeral $38d$ will be used, and when describing the individual switching elements on the side of the lower arm, the reference numerals 38Ad and 38Bd will be used.

As the switching elements 38, for example, insulated gate bipolar transistors (IGBT) can be used therefor, however, the switching elements 38 are not limited to this feature. FETs (Field Effect Transistors) may also be used as the switching elements 38.

The diode $36u$ on the side of the upper arm and the diode $36d$ on the side of the lower arm are connected in series with each other. The cathode of the diode $36u$ on the side of the upper arm is connected to one wiring 40A from among a pair of wirings 40A and 40B. The anode of the diode $36u$ on the side of the upper arm is connected to the cathode of the diode $36d$ on the side of the lower arm. The anode of the diode $36d$ on the side of the lower arm is connected to another wiring 40B from among the pair of wirings 40A and 40B.

A rectifier circuit is constituted by these diodes 36Au, 36Ad, 36Bu, and 36Bd.

The switching element $38u$ on the side of the upper arm and the switching element $38d$ on the side of the lower arm are connected in series with each other. A first terminal of the switching element $38u$ on the side of the upper arm is connected to the cathode of the diode $36u$ on the side of the upper arm. In the case that the switching elements 38, for example, are IGBTs, the first terminal is a collector. In the case that the switching elements 38, for example, are FETs, the first terminal is one of a source or a drain. A second terminal of the switching element $38u$ on the side of the upper arm is connected to the anode of the diode $36u$ on the side of the upper arm. In the case that the switching elements 38, for example, are IGBTs, the second terminal is an emitter. In the case that the switching elements 38, for example, are FETs, the second terminal is the other one of the source or the drain. A first terminal of the switching element 38*d* on the side of the lower arm is connected to the cathode of the diode 36*d* on the side of the lower arm. A second terminal of the switching element 38*d* on the side of the lower arm is connected to the anode of the diode 36*d* on the side of the lower arm.

A node 42A connected to the anode of the diode 36Au on the side of the upper arm, the second terminal of the switching element 38Au on the side of the upper arm, the cathode of the diode 36Ad on the side of the lower arm, and the first terminal of the switching element 38Ad on the side of the lower arm is connected to the power line 32A.

A node 42B connected to the anode of the diode 36Bu on the side of the upper arm, the second terminal of the switching element 38Bu on the side of the upper arm, the cathode of the diode 36Bd on the side of the lower arm, and the first terminal of the switching element 38Bd on the side of the lower arm is connected to the power line 32B.

A control circuit 46 is further provided in the control device 12 for the mobile body. The control circuit 46 is capable of performing a control with respect to the power conversion unit 28. More specifically, the control circuit 46 switches the switching elements 38 by applying a voltage to third terminals (gates) of the switching elements 38, on the basis of a signal (command) supplied from a later-described control device 18. An improvement in the power factor can be achieved by appropriately switching the switching elements 38.

Concerning the AC power supplied from the electrical power source device 20 to the power conversion unit 28, an improvement in the power factor thereof can be achieved by switching the switching elements 38. The AC power can be converted into DC power by the rectifier circuit that is constituted by the diodes 36Au, 36Ad, 36Bu, and 36Bd. In this manner, in the charging mode, the power conversion unit 28 is capable of functioning as a power factor correction (PFC: Power Factor Correction) circuit (or a power factor improvement circuit).

One end of the smoothing capacitor 44 is connected to the wiring 40A. Another end of the smoothing capacitor 44 is connected to the wiring 40B. The smoothing capacitor 44 is capable of smoothing the DC voltage between the pair of wirings 40A and 40B. More specifically, the smoothing capacitor 44 is capable of smoothing the DC voltage generated in the power conversion unit 28. The DC power after having been smoothed by the smoothing capacitor 44 can be supplied to the power conversion unit 50.

By appropriately switching the switching elements 38, the control circuit 46 is capable of converting the DC power supplied from the side of the smoothing capacitor 44 into AC power. More specifically, by appropriately switching the switching elements 38, the control circuit 46 is capable of converting the DC power supplied from the side of the power conversion unit 50 into AC power. The AC power that is generated in this manner can be supplied to the electrical loads 108 via the power lines 32A and 32B and the power lines 31A and 31B. In this manner, in the electrical power supplying mode, the power conversion unit 28 is capable of functioning as an inverter.

As noted previously, the power conversion unit 50 is equipped with the conversion unit 52, the isolation transformer 54, and the conversion unit 56.

The conversion unit 52 is capable of supplying the DC power supplied from the side of the smoothing capacitor 44 to the isolation transformer 54. More specifically, the conversion unit 52 is capable of supplying the DC power supplied from the side of the power conversion unit 28 to the isolation transformer 54.

The conversion unit 52 is equipped with power element units 60A and 60B respectively corresponding to a pair of wirings 58A and 58B that are connected to the isolation transformer 54. An H-bridge circuit is constituted by the power element units 60A and 60B.

The power element unit 60A corresponding to the wiring 58A is equipped with a diode 62Au on the side of an upper arm, a diode 62Ad on the side of a lower arm, a switching element 64Au on the side of the upper arm, and a switching element 64Ad on the side of the lower arm.

The power element unit 60B corresponding to the wiring 58B is equipped with a diode 62Bu on the side of an upper arm, a diode 62Bd on the side of a lower arm, a switching element 64Bu on the side of the upper arm, and a switching element 64Bd on the side of the lower arm.

When describing the diodes on the side of the upper arm in general, the reference numeral 62*u* will be used, and when describing the individual diodes on the side of the upper arm, the reference numerals 62Au and 62Bu will be used. Further, when describing the diodes on the side of the lower arm in general, the reference numeral 62*d* will be used, and when describing the individual diodes on the side of the lower arm, the reference numerals 62Ad and 62Bd will be used.

When describing the switching elements in general, the reference numeral 64 will be used, and when describing the individual switching elements, the reference numerals 64Au, 64Ad, 64Bu, and 64Bd will be used. Further, when describing the switching elements on the side of the upper arm in general, the reference numeral 64*u* will be used, and when describing the individual switching elements on the side of the upper arm, the reference numerals 64Au and 64Bu will be used. Further, when describing the switching elements on the side of the lower arm in general, the reference numeral 64*d* will be used, and when describing the individual switching elements on the side of the lower arm, the reference numerals 64Ad and 64Bd will be used.

As the switching elements 64, similar to the above-described switching elements 38, for example, insulated gate bipolar transistors can be used therefor, however, the switching elements 64 are not limited to this feature. FETs may also be used as the switching elements 64.

The diode 62*u* on the side of the upper arm and the diode 62*d* on the side of the lower arm are connected in series with each other. The cathode of the diode 62*u* on the side of the upper arm is connected to the wiring 40A. The anode of the diode 62*u* on the side of the upper arm is connected to the cathode of the diode 62*d* on the side of the lower arm. The anode of the diode 62*d* on the side of the lower arm is connected to the wiring 40B.

The switching element 64*u* on the side of the upper arm and the switching element 64*d* on the side of the lower arm are connected in series with each other. A first terminal of the switching element 64*u* on the side of the upper arm is connected to the cathode of the diode 62*u* on the side of the upper arm. In the case that the switching elements 64, for example, are IGBTs, the first terminal is a collector. In the case that the switching elements 64, for example, are FETs, the first terminal is one of a source or a drain. A second terminal of the switching element 64*u* on the side of the upper arm is connected to the anode of the diode 62*u* on the side of the upper arm. In the case that the switching elements 64, for example, are IGBTs, the second terminal is an emitter. In the case that the switching elements 64, for example, are FETs, the second terminal is the other one of the source or the drain. A first terminal of the switching element 64d on the side of the lower arm is connected to the cathode of the diode 62d on the side of the lower arm. A second terminal of the switching element 64d on the side of the lower arm is connected to the anode of the diode 62d on the side of the lower arm.

A node 66A connected to the anode of the diode 62Au on the side of the upper arm, the second terminal of the switching element 64Au on the side of the upper arm, the cathode of the diode 62Ad on the side of the lower arm, and the first terminal of the switching element 64Ad on the side of the lower arm is connected to the wiring 58A.

A node 66B connected to the anode of the diode 62Bu on the side of the upper arm, the second terminal of the switching element 64Bu on the side of the upper arm, the cathode of the diode 62Bd on the side of the lower arm, and the first terminal of the switching element 64Bd on the side of the lower arm is connected to the wiring 58B.

The control circuit 46 can implement a pulse width modulation (PWM) control with respect to the conversion unit 52. More specifically, the control circuit 46 switches the switching elements 64 by applying a voltage to third terminals (gates) of the switching elements 64, on the basis of a signal supplied from the control device 18. By the switching elements 64 being appropriately subjected to switching by the control circuit 46, the DC power supplied from the side of the smoothing capacitor 44 can be converted into AC power. More specifically, by the switching elements 64 being appropriately subjected to switching by the control circuit 46, the DC power supplied from the side of the power conversion unit 28 can be converted into AC power. The AC power that is generated in this manner can be supplied to the side of the isolation transformer 54 via the wirings 58A and 58B. In this manner, in the charging mode, the conversion unit 52 is capable of functioning as an inverter.

A rectifier circuit is constituted by the diodes 62Au, 62Ad, 62Bu, and 62Bd. The AC power supplied from the side of the isolation transformer 54 can be converted into DC power by the rectifier circuit that is constituted by the diodes 62Au, 62Ad, 62Bu, and 62Bd. The DC power that is generated in this manner can be supplied to the side of the smoothing capacitor 44 via the wirings 40A and 40B. More specifically, the DC power that is generated in this manner can be supplied to the side of the power conversion unit 28 via the wirings 40A and 40B.

By appropriately switching the switching elements 64, the control circuit 46 is capable of adjusting the voltage of the DC power supplied from the side of the isolation transformer 54 to the side of the smoothing capacitor 44. More specifically, by appropriately switching the switching elements 64, the control circuit 46 is capable of adjusting the voltage of the DC power supplied from the side of the isolation transformer 54 to the side of the power conversion unit 28. The AC power supplied from the side of the isolation transformer 54 can be converted in this manner into DC power by the conversion unit 52. In this manner, in the electrical power supplying mode, the conversion unit 52 is capable of functioning as a converter.

The smoothing capacitor 44 is capable of smoothing the DC voltage supplied from the side of the conversion unit 52. More specifically, the smoothing capacitor 44 is capable of smoothing the DC voltage that was rectified by the rectifier circuit constituted by the diodes 62Au, 62Ad, 62Bu, and 62Bd.

The isolation transformer 54 is capable of elevating the AC power supplied from the side of the conversion unit 52, and supplying the elevated AC power to the side of the conversion unit 56. Further, the isolation transformer 54 is capable of stepping down the AC power supplied from the side of the conversion unit 56, and supplying the stepped down AC power to the side of the conversion unit 52.

The conversion unit 56 is capable of converting the AC power supplied from the side of the isolation transformer 54 into a DC voltage, and supplying the DC voltage to the side of the smoothing capacitor 68. More specifically, the conversion unit 56 is capable of converting the AC power supplied from the side of the isolation transformer 54 into a DC voltage, and supplying the DC voltage to the side of the rechargeable energy storage system 14.

The conversion unit 56 is equipped with power element units 72A and 72B respectively corresponding to a pair of wirings 70A and 70B that are connected to the isolation transformer 54. An H-bridge circuit is constituted by the power element units 72A and 72B.

The power element unit 72A corresponding to the wiring 70A is equipped with a diode 74Au on the side of an upper arm, a diode 74Ad on the side of a lower arm, a switching element 76Au on the side of the upper arm, and a switching element 76Ad on the side of the lower arm.

The power element unit 72B corresponding to the wiring 70B is equipped with a diode 74Bu on the side of an upper arm, a diode 74Bd on the side of a lower arm, a switching element 76Bu on the side of the upper arm, and a switching element 76Bd on the side of the lower arm.

When describing the diodes on the side of the upper arm in general, the reference numeral 74$u$ will be used, and when describing the individual diodes on the side of the upper arm, the reference numerals 74Au and 74Bu will be used. Further, when describing the diodes on the side of the lower arm in general, the reference numeral 74$d$ will be used, and when describing the individual diodes on the side of the lower arm, the reference numerals 74Ad and 74Bd will be used.

When describing the switching elements in general, the reference numeral 76 will be used, and when describing the individual switching elements, the reference numerals 76Au, 76Ad, 76Bu, and 76Bd will be used. Further, when describing the switching elements on the side of the upper arm in general, the reference numeral 76$u$ will be used, and when describing the individual switching elements on the side of the upper arm, the reference numerals 76Au and 76Bu will be used. Further, when describing the switching elements on the side of the lower arm in general, the reference numeral 76$d$ will be used, and when describing the individual switching elements on the side of the lower arm, the reference numerals 76Ad and 76Bd will be used.

As the switching elements 76, similar to the above-described switching elements 38 and 64, for example, insulated gate bipolar transistors can be used therefor, however, the switching elements 76 are not limited to this feature. FETs may also be used as the switching elements 76.

The diode 74$u$ on the side of the upper arm and the diode 74$d$ on the side of the lower arm are connected in series with each other. The cathode of the diode 74$u$ on the side of the upper arm is connected to one wiring 78A. The anode of the diode 74$u$ on the side of the upper arm is connected to the cathode of the diode 74$d$ on the side of the lower arm. The anode of the diode 74$d$ on the side of the lower arm is connected to one wiring 78B.

The switching element 76$u$ on the side of the upper arm and the switching element 76$d$ on the side of the lower arm are connected in series with each other. A first terminal of the switching element 76$u$ on the side of the upper arm is connected to the cathode of the diode 74u on the side of the upper arm. In the case that the switching elements 76, for example, are IGBTs, the first terminal is a collector. In the case that the switching elements 76, for example, are FETs, the first terminal is one of a source or a drain. A second terminal of the switching element 76u on the side of the upper arm is connected to the anode of the diode 74u on the side of the upper arm. In the case that the switching elements 76, for example, are IGBTs, the second terminal is an emitter. In the case that the switching elements 76, for example, are FETs, the second terminal is the other one of the source or the drain. A first terminal of the switching element 76d on the side of the lower arm is connected to the cathode of the diode 74d on the side of the lower arm. A second terminal of the switching element 76d on the side of the lower arm is connected to the anode of the diode 74d on the side of the lower arm.

A node 80A connected to the anode of the diode 74Au on the side of the upper arm, the second terminal of the switching element 76Au on the side of the upper arm, the cathode of the diode 74Ad on the side of the lower arm, and the first terminal of the switching element 76Ad on the side of the lower arm is connected to the wiring 70A.

A node 80B connected to the anode of the diode 74Bu on the side of the upper arm, the second terminal of the switching element 76Bu on the side of the upper arm, the cathode of the diode 74Bd on the side of the lower arm, and the first terminal of the switching element 76Bd on the side of the lower arm is connected to the wiring 70B.

A rectifier circuit is constituted by the diodes 74Au, 74Ad, 74Bu, and 74Bd. The AC power supplied from the side of the isolation transformer 54 can be converted into DC power by the rectifier circuit that is constituted by the diodes 74Au, 74Ad, 74Bu, and 74Bd. The DC power that is generated in this manner can be supplied to the side of the smoothing capacitor 68 via the wirings 78A and 78B.

The control circuit 46 can implement a pulse width modulation control with respect to the conversion unit 56. More specifically, the control circuit 46 switches the switching elements 76 by applying a voltage to third terminals (gates) of the switching elements 76, on the basis of a signal supplied from the control device 18. By appropriately switching the switching elements 76, the control circuit 46 is capable of adjusting the voltage of the DC power supplied from the side of the isolation transformer 54 to the side of the smoothing capacitor 68. The AC power supplied from the side of the isolation transformer 54 can be converted in this manner into DC power by the conversion unit 56. In this manner, in the charging mode, the conversion unit 56 is capable of functioning as a converter.

By the switching elements 76 being appropriately subjected to switching by the control circuit 46, the DC power supplied from the side of the smoothing capacitor 68 can be converted into AC power. The AC power that is generated in this manner can be supplied to the side of the isolation transformer 54 via the wirings 70A and 70B. In this manner, in the electrical power supplying mode, the conversion unit 56 is capable of functioning as an inverter.

The smoothing capacitor 68 is provided on the side of the battery 88 with respect to the power conversion unit 50. One end of the smoothing capacitor 68 is connected to the wiring 78A. Another end of the smoothing capacitor 68 is connected to the wiring 78B. The smoothing capacitor 68 is capable of smoothing the DC voltage supplied from the side of the conversion unit 56. More specifically, the smoothing capacitor 68 is capable of smoothing the DC voltage that was rectified by the rectifier circuit constituted by the diodes 74Au, 74Ad, 74Bu, and 74Bd.

The rechargeable energy storage system 14 includes a smoothing capacitor 84, a precharging circuit 86, and the battery 88.

The smoothing capacitor 84 is provided on the side of the control device 12 for the mobile body with respect to the battery 88. One end of the smoothing capacitor 84 is connected to the wiring 78A. Another end of the smoothing capacitor 84 is connected to the wiring 78B.

The precharging circuit 86 is provided, for example, on the wiring 78A at a location between the battery 88 and the smoothing capacitor 84. The precharging circuit 86 comprises a resistor 90, a switch 92, and a switch 94.

The switch 94 is provided, for example, on the wiring 78A at a location between the battery 88 and the smoothing capacitors 68 and 84. As the switch 94, for example, a relay contact or the like can be used, however, the switch 94 is not limited to this feature.

The resistor 90 is connected in parallel with the switch 94. The switch 92 is connected in series with respect to the resistor 90. As the switch 92, for example, a relay contact or the like can be used, however, the switch 92 is not limited to this feature. One end of the resistor 90 is electrically connected to one end of the battery 88. Another end of the resistor 90 is connected to one end of each of the smoothing capacitors 68 and 84 via the switch 92 and the wiring 78A.

When the switch 92 is turned on, the other end of the resistor 90 can be connected to the smoothing capacitors 68 and 84 via the wiring 78A. On the other hand, when the switch 92 is turned off, a state is brought about in which the other end of the resistor 90 is not connected to the smoothing capacitors 68 and 84.

When the switch 94 is turned on in a state in which the switch 92 is turned on, a state is brought about in which both ends of the resistor 90 are short-circuited. When the switch 94 is turned off, a state is brought about in which both ends of the resistor 90 are not short-circuited.

When supply of the DC power from the side of the battery 88 to the charging and electrical power supplying unit 16 is initiated, the switch 92 is turned on in a state in which the switch 94 is turned off. When the switch 92 is turned on in a state in which the switch 94 is turned off, the electrical power from the battery 88 is supplied to the smoothing capacitors 68 and 84 via the resistor 90. Therefore, the supply of electrical power from the side of the battery 88 to the smoothing capacitors 68 and 84 is limited by the resistor 90. Since the supply of electrical power from the side of the battery 88 to the smoothing capacitors 68 and 84 is limited by the resistor 90, it is possible to prevent a large inrush current from flowing into the smoothing capacitors 68 and 84. After the smoothing capacitors 68 and 84 have been fully charged, the switch 94 can be closed.

A switch 96 is provided on the wiring 78B at a location between the battery 88 and the smoothing capacitor 84. As the switch 96, for example, a relay contact or the like can be used, however, the switch 96 is not limited to this feature.

The control device 18 is further provided in the control device 12 for the mobile body. The control device 18 controls the control device 12 for the mobile body in its entirety. The control device 18 is equipped with a computation unit 98 and a storage unit 100. The computation unit 98 may be configured by a processor such as a CPU (Central Processing Unit) or the like, however, the present invention is not limited to this feature. The storage unit 100 is equipped, for example, with a volatile memory and a non-volatile memory, neither of which are shown. Examples of the volatile memory include, for example, a RAM (Random Access Memory) or the like. Examples of the nonvolatile memory include, for example, a ROM (Read Only Memory), a flash memory, or the like. Programs, data, tables, etc., can be stored in the storage unit 100.

The computation unit 98 is equipped with the control unit 102, a connection determination unit (connection detection unit) 103, and a failure determination unit (failure detection unit) 104. The control unit 102, the connection determination unit 103, and the failure determination unit 104 can be realized by programs stored in the storage unit 100 being executed by the computation unit 98.

The control unit 102 controls the control device 18 in its entirety. The control unit 102 is capable of controlling the charging and electrical power supplying unit 16 and the switching units 41.

The connection determination unit 103 is capable of determining whether or not the electrical loads 108 are connected to the electrical power supplying connectors 29. More specifically, the connection determination unit 103 is capable of determining whether or not the electrical load 108B is connected to the mobile body exterior electrical power supplying connector 29D.

The failure determination unit 104 can perform a failure determination of the charging and electrical power supplying unit 16. The failure determination unit 104 can execute the failure determination to determine a failure of the switching units 41 based on the conductive state when the conductive path is switched. The conductive state when the conductive path is switched can be determined based on information supplied from the voltage sensors 27A to 27C and the like.

In the case it is determined by the connection determination unit 103 that the electrical loads 108 are connected to the electrical power supplying connectors 29, the control unit 102 limits execution of the failure determination by the failure determination unit 104. More specifically, in the case it is determined by the connection determination unit 103 that the electrical load 108B is connected to the mobile body exterior electrical power supplying connector 29D, the control unit 102 limits execution of the failure determination by the failure determination unit 104.

When the failure determination is executed by the failure determination unit 104, the control unit 102 can implement the following controls. More specifically, the control unit 102 controls one of the switches 30 from among the plurality of switches 30 provided in the first switching unit 41A, in a manner so that one of the power lines 32 from among the plurality of power lines 32 is made conductive with the mobile body interior electrical power supplying connectors 29A to 29C or the mobile body exterior electrical power supplying connector 29D. Further, the control unit 102 controls one of the switches 39 from among the plurality of switches 39 provided in the second switching unit 41B, in a manner so that the one of the power lines 32 is made conductive with the mobile body exterior electrical power supplying connector 29D.

In the case that the failure determination is executed by the failure determination unit 104 with respect to the first switching unit 41A, the control unit 102 performs the failure determination using the electrical power supplied from the electrical power source 26 positioned externally of the mobile body 10. In the case that the failure determination is executed by the failure determination unit 104 with respect to the second switching unit 41B, the control unit 102 performs the failure determination using the electrical power supplied from the battery 88.

The control device 18 is further equipped with a communication unit 106 for carrying out communications with the electrical power source device 20.

Figure 2:
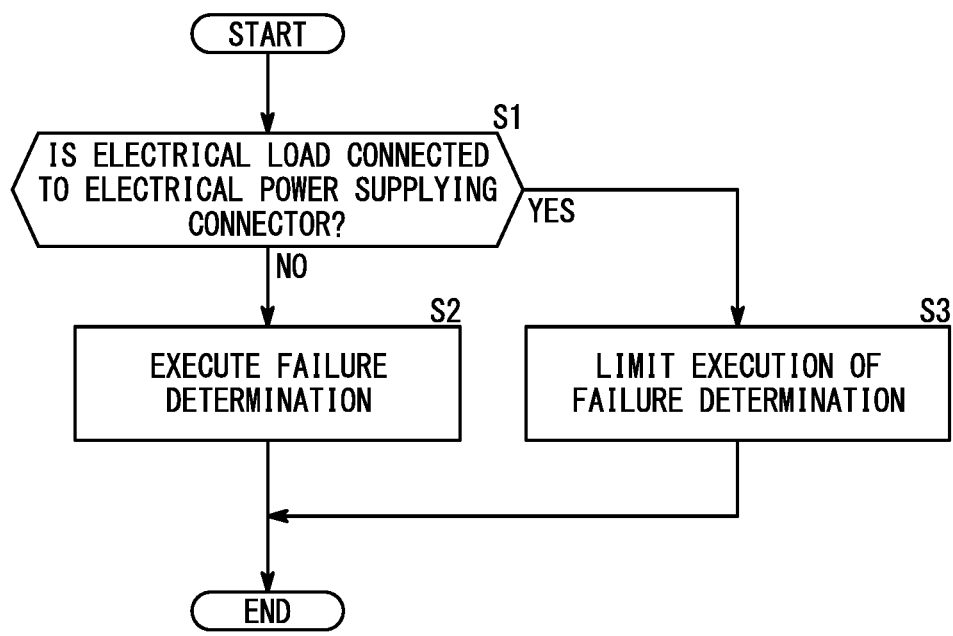
FIG. 2 is a flowchart showing operations of a control device for the mobile body according to the embodiment.

FIG. 2 is a flowchart showing operations of the control device for the mobile body according to the present embodiment. Operations that take place in the failure detection mode are shown in FIG. 2.

In step S1, the connection determination unit 103 determines whether or not the electrical loads 108 are connected to the electrical power supplying connectors 29. In the case it is determined by the connection determination unit 103 that the electrical loads 108 are not connected to the electrical power supplying connectors 29 (NO in step S1), the process transitions to step S2. In the case it is determined by the connection determination unit 103 that the electrical loads 108 are connected to the electrical power supplying connectors 29 (YES in step S1), the process transitions to step S3.

In step S2, the control unit 102 causes the failure determination unit 104 to execute the failure determination.

In step S3, the control unit 102 limits execution of the failure determination by the failure determination unit 104. In this manner, the process shown in FIG. 2 is brought to an end.

Next, a description will be given concerning an example of operations of the control device 12 for the mobile body at the time of the failure determination.

Figure 3:
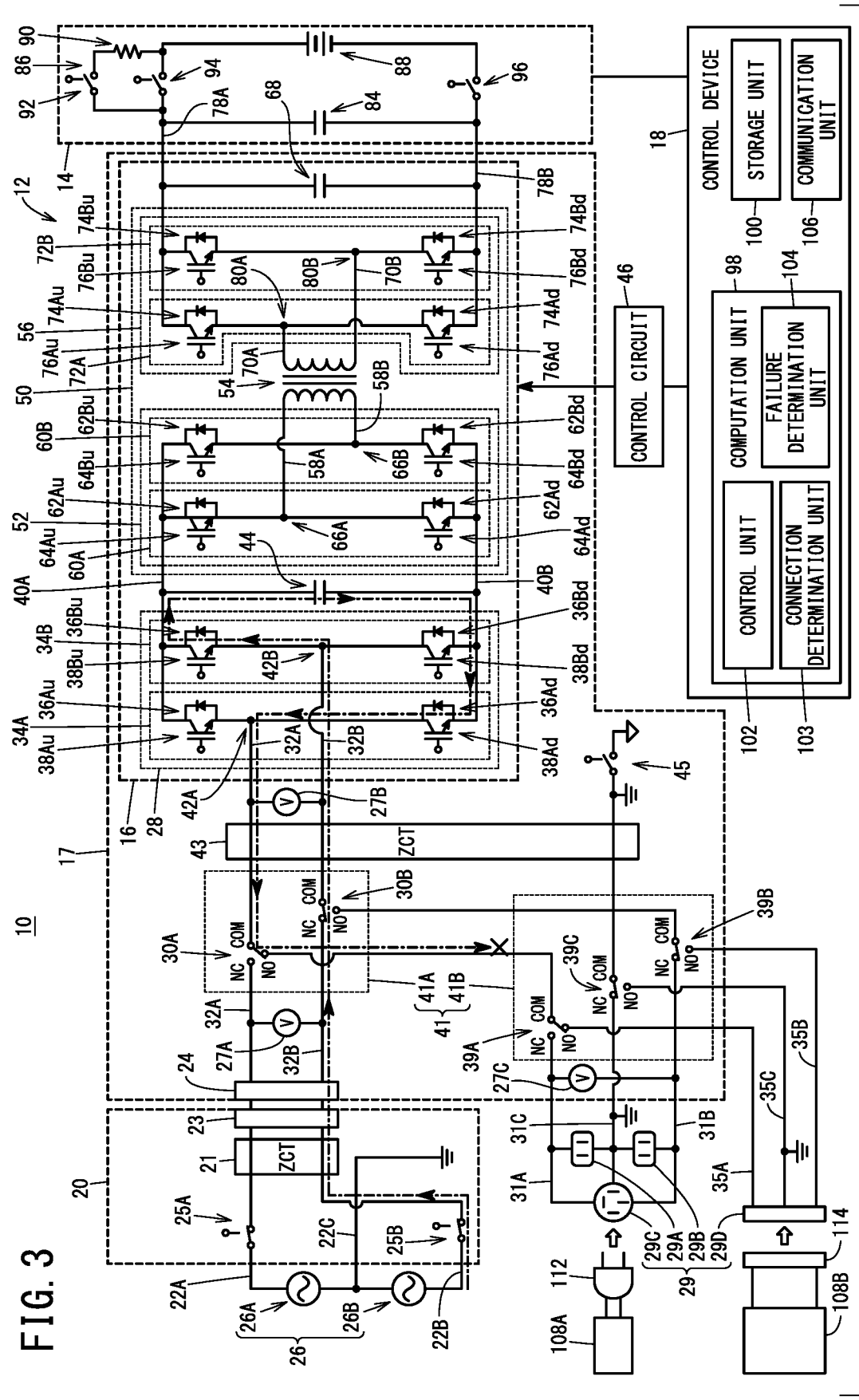
FIG. 3 is a block diagram showing an example of operations of the control device for the mobile body according to the embodiment.
Figure 4:
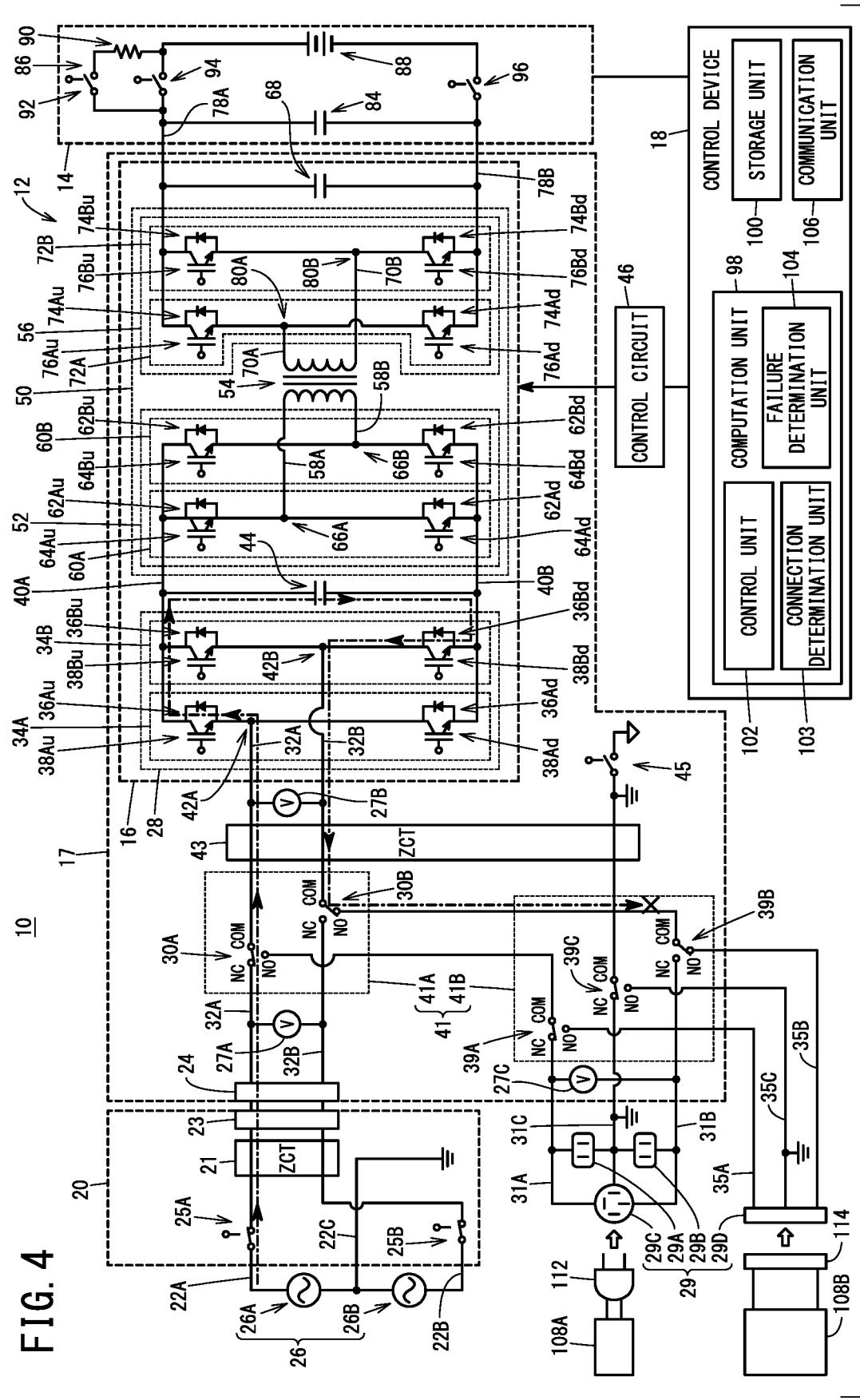
FIG. 4 is a block diagram showing an example of operations of the control device for the mobile body according to the embodiment.

First, a description will be given with reference to FIGS. 1, 3, and 4 concerning an example in which a failure of the switches 30 provided in the first switching unit 41A is determined. FIG. 3 and FIG. 4 are block diagrams showing an example of operations of the control device for the mobile body according to the present embodiment. As discussed previously, a failure of the switching units 41 can be determined based on the conductive state when the conductive path is switched between the charging and electrical power supplying unit 16, the charging connector 24, and the electrical power supplying connectors 29. At a stage prior to switching the conductive state between the charging and electrical power supplying unit 16, the charging connector 24, and the electrical power supplying connectors 29, the control unit 102 sets the switches 30 and 39 provided in the switching units 41, for example, in the following manner. More specifically, as shown in FIG. 1, the control unit 102 controls the respective switches 30 in a manner so that, in every one of the switches 30, a state is brought about in which the common terminal COM and the normally closed terminal NC thereof are connected. Further, as shown in FIG. 1, the control unit 102 controls the respective switches 39 in a manner so that, in every one of the switches 39, a state is brought about in which the common terminal COM and the normally closed terminal NC thereof are connected. In the foregoing manner, when the failure determination is executed with respect to the first switching unit 41A, the electrical power supplied from the electrical power source 26 positioned externally of the mobile body 10 is used. In order for the electrical power from the electrical power source 26 to be supplied to the charging and electrical power supplying device 17 via the electrical power source device 20, the control unit 102 controls the electrical power source device 20 so as to bring about a state in which the switches 25A and 25B are closed. The control with respect to the electrical power source device 20 may be performed through the communication unit 106. In such a state, the electrical power from the electrical power source 26 is supplied to the charging and electrical power supplying unit 16 via the power lines 32A and 32B and the switches 30A and 30B.

Further, in such a state, the electrical power from the electrical power source 26 is supplied to both the voltage sensor 27A and the voltage sensor 27B. Therefore, in the voltage sensor 27A and in the voltage sensor 27B as well, it is possible to detect the voltage of the electrical power supplied from the electrical power source 26.

Thereafter, the control unit 102 switches the conductive path between the charging and electrical power supplying unit 16, the charging connector 24, and the electrical power supplying connectors 29. For example, in the case that a failure of the switch 30A is determined, the control unit 102 performs the following controls. More specifically, in the case of determining whether or not the switch 30A is fused, the control unit 102 performs the following controls. As shown in FIG. 3, the control unit 102 controls the switch 30A in a manner so that the common terminal COM and the normally open terminal NO in the switch 30A are connected, together with controlling the switch 39A in a manner so that the common terminal COM and the normally open terminal NO in the switch 39A are connected. In the case that a failure in the switch 30A is not occurring, the common terminal COM and the normally open terminal NO in the switch 30A are connected. More specifically, in the case that fusing in the switch 30A has not occurred, the common terminal COM and the normally open terminal NO in the switch 30A are connected. When the common terminal COM and the normally open terminal NO in the switch 30A are connected, a state is brought about in which the voltage of the electrical power source 26 is not applied to the voltage sensor 27B. Therefore, in the voltage sensor 27A, a state is brought about in which the voltage of the electrical power source 26 is detected, while on the other hand, in the voltage sensor 27B, the voltage of the electrical power source 26 is not detected. The fact that, in the voltage sensor 27A, the voltage of the electrical power source 26 is detected, while on the other hand, in the voltage sensor 27B, the voltage of the electrical power source 26 is not detected implies that a failure in the switch 30A is not occurring. More specifically, the fact that, in the voltage sensor 27A, the voltage of the electrical power source 26 is detected, while on the other hand, in the voltage sensor 27B, the voltage of the electrical power source 26 is not detected implies that a failure in the switch 30A has not occurred. In such a case, the failure determination unit 104 can determine that a failure is not occurring in the switching units 41. More specifically, the failure determination unit 104 can determine that fusing in the switch 30A has not occurred. In the voltage sensor 27A and in the voltage sensor 27B as well, the fact that the voltage of the electrical power source 26 is detected implies that a failure in the switch 30A is occurring. More specifically, in the voltage sensor 27A and in the voltage sensor 27B as well, the fact that the voltage of the electrical power source 26 is detected implies that fusing in the switch 30A has occurred. In such a case, the failure determination unit 104 can determine that a failure is occurring in the switching units 41. More specifically, the failure determination unit 104 can determine that a failure in the switch 30A has occurred. As discussed previously, after it is determined by the connection determination unit 103 that the electrical load 108B is not connected to the mobile body exterior electrical power supplying connector 29D, the failure determination is executed by the failure determination unit 104. Since the electrical load 108B is not connected to the mobile body exterior electrical power supplying connector 29D, regardless of the fact that the common terminal COM and the normally open terminal NO in the switch 39A are connected, current does not flow into the mobile body exterior electrical power supplying connector 29D. Since current does not flow into the mobile body exterior electrical power supplying connector 29D, current does not flow through the power lines 22A and 22B that penetrate through the ZCT 21. Further, current does not flow through the power lines 32A and 32B that penetrate through the ZCT 43. Therefore, in the ZCT 21 and in the ZCT 43 as well, erroneous detection of electric leakage does not occur.

The failure determination of the switch 30B can also be performed in the same manner as described above. More specifically, first, at a stage prior to switching the conductive state between the charging and electrical power supplying unit 16, the charging connector 24, and the electrical power supplying connectors 29, the control unit 102 sets the switches 30 and 39 provided in the switching units 41, for example, in the following manner. More specifically, as shown in FIG. 1, the control unit 102 controls the respective switches 30 in a manner so that, in every one of the switches 30, a state is brought about in which the common terminal COM and the normally closed terminal NC thereof are connected. Further, as shown in FIG. 1, the control unit 102 controls the respective switches 39 in a manner so that, in every one of the switches 39, a state is brought about in which the common terminal COM and the normally closed terminal NC thereof are connected. Further, as noted previously, the control unit 102 controls the electrical power source device 20 so as to bring about a state in which the switches 25A and 25B are closed.

Thereafter, as shown in FIG. 4, the control unit 102 controls the switch 30B in a manner so that the common terminal COM and the normally open terminal NO in the switch 30B are connected, together with controlling the switch 39B in a manner so that the common terminal COM and the normally open terminal NO in the switch 39B are connected. In the case that a failure in the switch 30B is not occurring, the common terminal COM and the normally open terminal NO in the switch 30B are connected. In the case that fusing in the switch 30B has not occurred, the common terminal COM and the normally open terminal NO in the switch 30B are connected. When the common terminal COM and the normally open terminal NO in the switch 30B are connected, a state is brought about in which the voltage of the electrical power source 26 is not applied to the voltage sensor 27B. Therefore, in the voltage sensor 27A, a state is brought about in which the voltage of the electrical power source 26 is detected, while on the other hand, in the voltage sensor 27B, the voltage of the electrical power source 26 is not detected. The fact that, in the voltage sensor 27A, the voltage of the electrical power source 26 is detected, while on the other hand, in the voltage sensor 27B, the voltage of the electrical power source 26 is not detected implies that a failure in the switch 30B is not occurring. More specifically, the fact that, in the voltage sensor 27A, the voltage of the electrical power source 26 is detected, while on the other hand, in the voltage sensor 27B, the voltage of the electrical power source 26 is not detected implies that fusing in the switch 30B has not occurred. In such a case, the failure determination unit 104 can determine that a failure is not occurring in the switching units 41. More specifically, the failure determination unit 104 can determine that a failure in the switch 30B has not occurred. In the voltage sensor 27A and in the voltage sensor 27B as well, the fact that the voltage of the electrical power source 26 is detected implies that a failure in the switch 30B is occurring. More specifically, in the voltage sensor 27A and in the voltage sensor 27B as well, the fact that the voltage of the electrical power source 26 is detected implies that fusing in the switch 30B has occurred. In such a case, the failure determination unit 104 can determine that a failure is occurring in the switching units 41. More specifically, the failure determination unit 104 can determine that a failure in the switch 30B has occurred. As discussed previously, after it is determined by the connection determination unit 103 that the electrical load 108B is not connected to the mobile body exterior electrical power supplying connector 29D, the failure determination is executed by the failure determination unit 104. Since the electrical load 108B is not connected to the mobile body exterior electrical power supplying connector 29D, regardless of the fact that the common terminal COM and the normally open terminal NO in the switch 39B are connected, current does not flow into the mobile body exterior electrical power supplying connector 29D. Since current does not flow into the mobile body exterior electrical power supplying connector 29D, current does not flow through the power lines 22A and 22B that penetrate through the ZCT 21. Further, current does not flow through the power lines 32A and 32B that penetrate through the ZCT 43. Therefore, in the ZCT 21 and in the ZCT 43 as well, erroneous detection of electric leakage does not occur.

Figure 5:
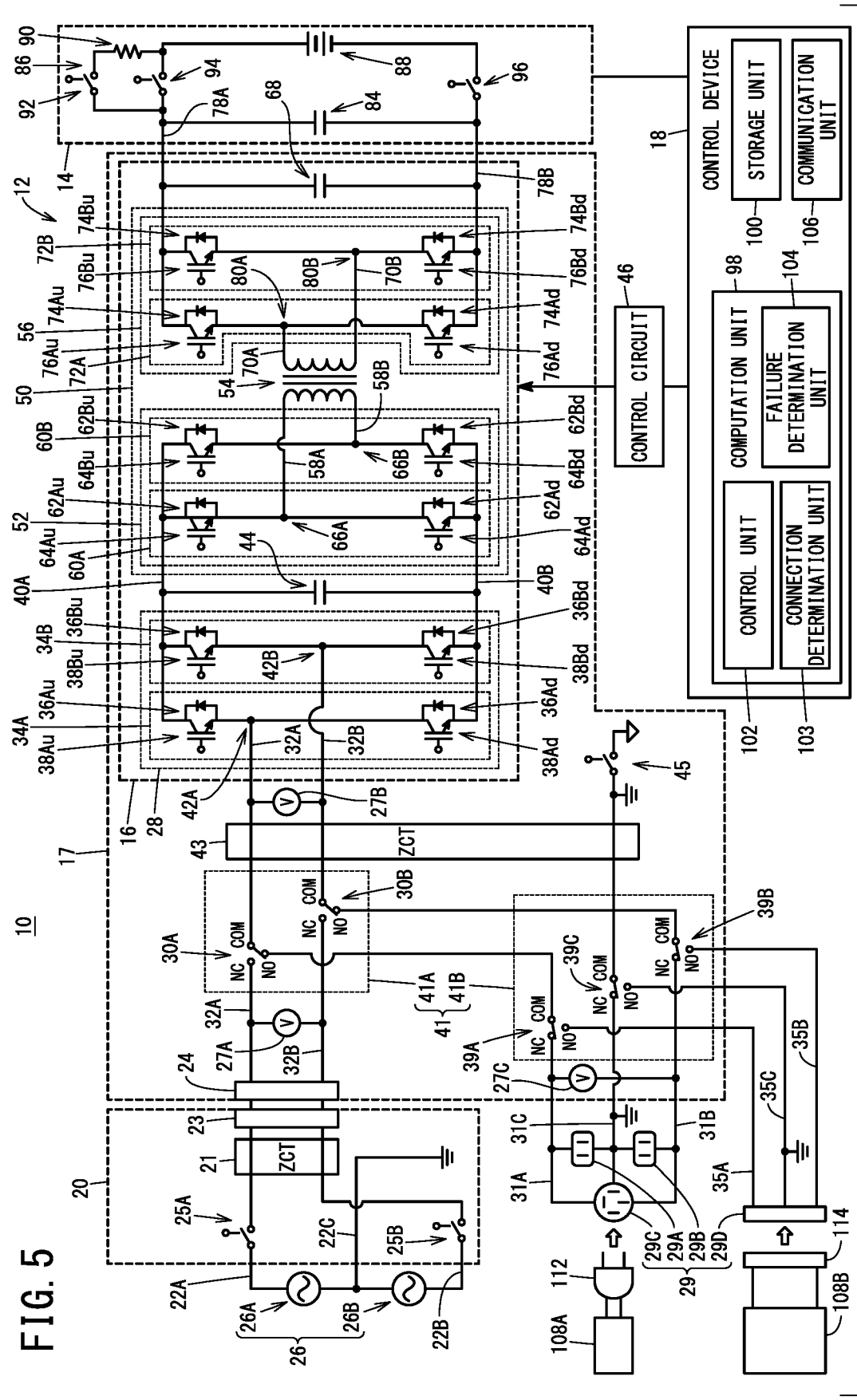
FIG. 5 is a block diagram showing an example of operations of the control device for the mobile body according to the embodiment.
Figure 6:
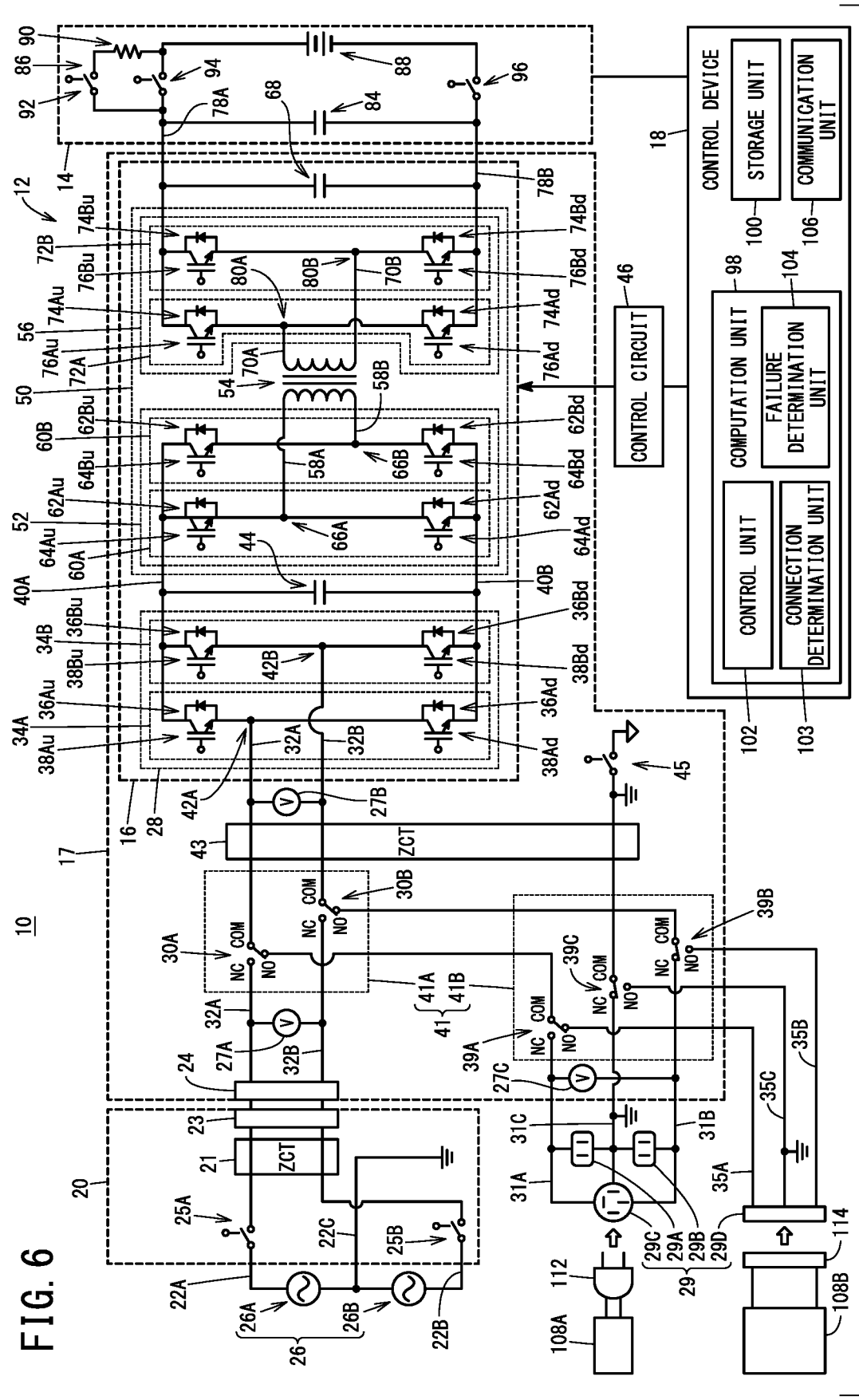
FIG. 6 is a block diagram showing an example of operations of the control device for the mobile body according to the embodiment.

Next, a description will be given with reference to FIGS. 5 and 6 concerning a case in which a failure of the switches 39 provided in the second switching unit 41B is determined. FIG. 5 and FIG. 6 are block diagrams showing an example of operations of the control device for the mobile body according to the present embodiment. In the case that the failure determination is executed with respect to the second switching unit 41B, as noted previously, the failure determination is performed using the electrical power supplied from the battery 88. At a stage prior to switching the conductive state between the charging and electrical power supplying unit 16, the charging connector 24, and the electrical power supplying connectors 29, the control unit 102 sets the switches 30 and 39 provided in the switching units 41, for example, in the following manner. More specifically, as shown in FIG. 5, the control unit 102 controls the respective switches 30 in a manner so that, in every one of the switches 30, a state is brought about in which the common terminal COM and the normally open terminal NO thereof are connected. Further, as shown in FIG. 5, the control unit 102 controls the respective switches 39 in a manner so that, in every one of the switches 39, a state is brought about in which the common terminal COM and the normally closed terminal NC thereof are connected. The control unit 102 controls the charging and electrical power supplying unit 16 in a manner so that the electrical power supplied from the side of the battery 88 is used to thereby supply the electrical power to the side of the electrical power supplying connectors 29. In such a state, the electrical power supplied from the battery 88 is supplied to the electrical power supplying connectors 29 via the power lines 32A and 32B, the switches 30A and 30B, and the power lines 31A and 31B. More specifically, in such a state, the electrical power supplied from the battery 88 via the charging and electrical power supplying unit 16 is supplied to the electrical power supplying connectors 29 via the power lines 32A and 32B, the switches 30A and 30B, and the power lines 31A and 31B. In such a state, in the voltage sensor 27B and in the voltage sensor 27C as well, it is possible to detect the voltage supplied from the battery 88 via the charging and electrical power supplying unit 16.

Thereafter, the control unit 102 switches the conductive path between the charging and electrical power supplying unit 16 and the electrical power supplying connectors 29. For example, in the case that a failure of the switch 39A is determined, as shown in FIG. 6, the switch 30A is controlled in a manner so that the common terminal COM and the normally open terminal NO in the switch 39A are connected. More specifically, in the case of determining whether or not the switch 39A has been fused, as shown in FIG. 6, the switch 30A is controlled in a manner so that the common terminal COM and the normally open terminal NO in the switch 39A are connected. In the case that a failure in the switch 30A is not occurring, the common terminal COM and the normally open terminal NO in the switch 39A are connected. More specifically, in the case that fusing in the switch 39A has not occurred, the common terminal COM and the normally open terminal NO in the switch 39A are connected. When the common terminal COM and the normally open terminal NO in the switch 39A are connected, a state is brought about in which the voltage supplied from the side of the battery 88 via the charging and electrical power supplying unit 16 is not applied to the voltage sensor 27C. Therefore, in the voltage sensor 27B, a state is brought about in which the voltage supplied from the side of the battery 88 via the charging and electrical power supplying unit 16 is detected, while on the other hand, in the voltage sensor 27C, the voltage supplied from the side of the battery 88 via the charging and electrical power supplying unit 16 is not detected. In the voltage sensor 27B, the fact that the voltage supplied from the side of the battery 88 via the charging and electrical power supplying unit 16 is detected, while on the other hand, in the voltage sensor 27C, the voltage supplied from the side of the battery 88 via the charging and electrical power supplying unit 16 is not detected implies that a failure in the switch 39A is not occurring. More specifically, in the voltage sensor 27B, the fact that the voltage supplied from the side of the battery 88 via the charging and electrical power supplying unit 16 is detected, while on the other hand, in the voltage sensor 27C, the voltage supplied from the side of the battery 88 via the charging and electrical power supplying unit 16 is not detected implies that fusing in the switch 39A has not occurred. In such a case, the failure determination unit 104 can determine that a failure is not occurring in the switching units 41. More specifically, the failure determination unit 104 can determine that a failure in the switch 39A has not occurred. In the voltage sensor 27B and in the voltage sensor 27C sensor as well, the fact that the voltage supplied from the side of the battery 88 via the charging and electrical power supplying unit 16 is detected implies that a failure in the switch 39A is occurring. More specifically, in the voltage sensor 27B and in the voltage sensor 27C sensor as well, the fact that the voltage supplied from the side of the battery 88 via the charging and electrical power supplying unit 16 is detected implies that fusing in the switch 39A has occurred. In such a case, the failure determination unit 104 can determine that a failure is occurring in the switching units 41. More specifically, the failure determination unit 104 can determine that a failure in the switch 39A has occurred.

Moreover, the failure determination of the switches 39B and 39C can also be performed in the same manner as described above.

In this manner, in the case it is determined by the connection determination unit 103 that the electrical loads 108 are connected to the electrical power supplying connectors 29, execution of the failure determination by the failure determination unit 104 with respect to the switching units 41 is limited. Since in the case that the electrical loads 108 are not connected to the electrical power supplying connectors 29, the failure determination is performed with respect to the switching units 41, in accordance with such a configuration, the control device 12 for the mobile body can be provided in which the failure determination with respect to the switching units 41 can be performed accurately while erroneous detection of electric leakage is prevented.

Modification

The control device for the mobile body, the control method therefor, and the mobile body according to a modification of the present embodiment will be described.

The present modification is a modification in which, even in the case that the failure determination is executed with respect to the first switching unit 41A, and even in the case that the failure determination is executed with respect to the second switching unit 41B, the electrical power supplied from the battery 88 is used.

Figure 7:
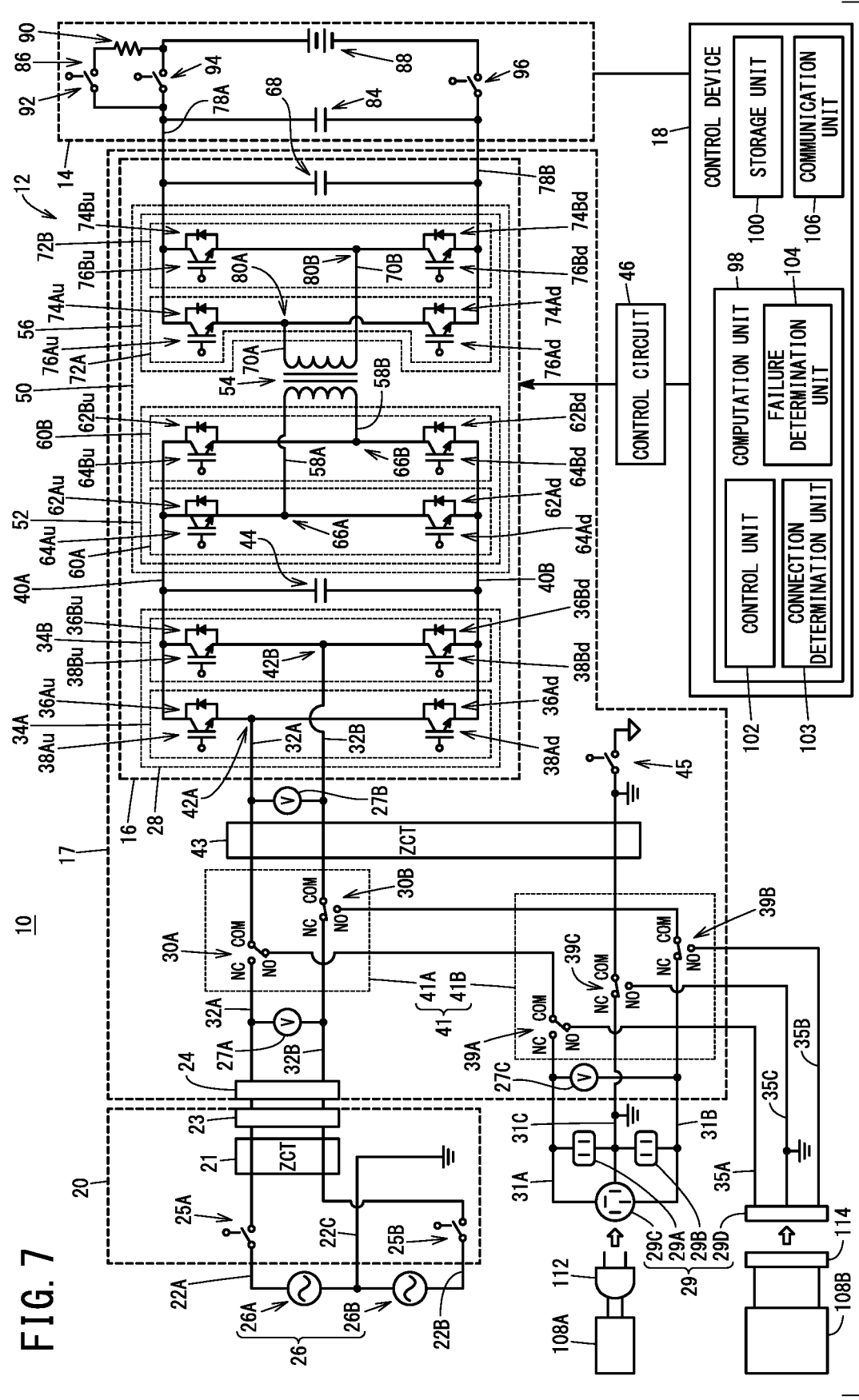
FIG. 7 is a block diagram showing an example of operations of the control device for the mobile body according to the embodiment.

First, a description will be given with reference to FIGS. 1 and 7 concerning a case in which a failure of the switches 30 provided in the first switching unit 41A is determined. FIG. 7 is a block diagram showing an example of operations of the control device for the mobile body according to the present exemplary embodiment. As discussed previously, a failure of the switching units 41 can be determined based on the conductive state when the conductive path is switched between the charging and electrical power supplying unit 16, the charging connector 24, and the electrical power supplying connectors 29. At a stage prior to switching the conductive state between the charging and electrical power supplying unit 16, the charging connector 24, and the electrical power supplying connectors 29, the control unit 102 sets the switches 30 and 39 provided in the switching units 41, for example, in the following manner. More specifically, as shown in FIG. 1, the control unit 102 controls the respective switches 30 in a manner so that, in every one of the switches 30, a state is brought about in which the common terminal COM and the normally closed terminal NC thereof are connected. Further, as shown in FIG. 1, the control unit 102 controls the respective switches 39 in a manner so that, in every one of the switches 39, a state is brought about in which the common terminal COM and the normally closed terminal NC thereof are connected. In the present modification, the electrical power supplied from the battery 88 is used when the failure determination is executed with respect to the first switching unit 41A. Since supplying of the electrical power from the electrical power source 26 to the charging and electrical power supplying device 17 via the electrical power source device 20 is unnecessary, the control unit 102 controls the electrical power source device 20 so as to keep a state in which the switches 25A and 25B are opened. Moreover, a failure of the switch 30 provided in the first switching unit 41A may be determined in a state in which the connector 23 provided in the electrical power source device 20 is not connected to the charging connector 24. The control unit 102 controls the charging and electrical power supplying unit 16 in a manner so that the supply of power is executed by the charging and electrical power supplying unit 16 using the electrical power supplied from the battery 88. In such a state, in the voltage sensor 27A and in the voltage sensor 27B as well, it is possible for the voltage supplied from the charging and electrical power supplying unit 16 to be detected.

Thereafter, the control unit 102 switches the conductive path between the charging and electrical power supplying unit 16, the charging connector 24, and the electrical power supplying connectors 29. For example, in the case that a failure of the switch 30A is determined, the control unit 102 performs the following controls. More specifically, in the case of determining whether or not the switch 30A is fused, the control unit 102 performs the following controls. As shown in FIG. 7, the control unit 102 controls the switch 30A in a manner so that the common terminal COM and the normally open terminal NO in the switch 30A are connected, together with controlling the switch 39A in a manner so that the common terminal COM and the normally open terminal NO in the switch 39A are connected. In the case that a failure in the switch 30A is not occurring, the common terminal COM and the normally open terminal NO in the switch 30A are connected. More specifically, in the case that fusing in the switch 30A has not occurred, the common terminal COM and the normally open terminal NO in the switch 30A are connected. When the common terminal COM and the normally open terminal NO in the switch 30A are connected, a state is brought about in which the voltage supplied from the charging and electrical power supplying unit 16 is not applied to the voltage sensor 27A. Therefore, in the voltage sensor 27B, a state is brought about in which the voltage supplied from the charging and electrical power supplying unit 16 is detected, while on the other hand, in the voltage sensor 27A, the voltage supplied from the charging and electrical power supplying unit 16 is not detected. More specifically, the fact that, in the voltage sensor 27B, the voltage supplied from the charging and electrical power supplying unit 16 is detected, while on the other hand, in the voltage sensor 27A, the voltage supplied from the charging and electrical power supplying unit 16 is not detected implies that a failure of the switch 30A is not occurring. More specifically, the fact that, in the voltage sensor 27B, the voltage supplied from the charging and electrical power supplying unit 16 is detected, while on the other hand, in the voltage sensor 27A, the voltage supplied from the charging and electrical power supplying unit 16 is not detected, implies that a failure is not occurring in the switch 30A. In such a case, the failure determination unit 104 can determine that a failure is not occurring in the switching units 41. More specifically, the failure determination unit 104 can determine that a failure in the switch 30A has not occurred. In the voltage sensor 27A and in the voltage sensor 27B as well, the fact that the voltage of the electrical power source 26 is detected implies that a failure in the switch 30A is occurring. More specifically, in the voltage sensor 27A and in the voltage sensor 27B as well, the fact that the voltage of the electrical power source 26 is detected implies that fusing in the switch 30A has occurred. In such a case, the failure determination unit 104 can determine that a failure is occurring in the switching units 41. More specifically, the failure determination unit 104 can determine that a failure in the switch 30A has occurred. As discussed previously, after it is determined by the connection determination unit 103 that the electrical load 108B is not connected to the mobile body exterior electrical power supplying connector 29D, the failure determination is executed by the failure determination unit 104. Since the electrical load 108B is not connected to the mobile body exterior electrical power supplying connector 29D, regardless of the fact that the common terminal COM and the normally open terminal NO in the switch 39A are connected, current does not flow into the mobile body exterior electrical power supplying connector 29D. Since current does not flow into the mobile body exterior electrical power supplying connector 29D, current does not flow through the power lines 22A and 22B that penetrate through the ZCT 21. Further, current does not flow through the power lines 32A and 32B that penetrate through the ZCT 43. Therefore, in the ZCT 21 and in the ZCT 43 as well, erroneous detection of electric leakage does not occur.

Moreover, the failure determination of the switch 30B can also be performed in the same manner as described above.

Concerning the failure determination of the switch 39 provided in the second switching unit 41B, since the failure determination is the same as the failure determination described above with reference to FIGS. 5 and 6, description thereof will be omitted.

In the foregoing manner, even in the case that the failure determination is executed with respect to the first switching unit 41A, and even in the case that the failure determination is executed with respect to the second switching unit 41B, the electrical power supplied from the battery 88 may be used.

The present invention is not limited to the above-described embodiments, and various configurations can be adopted therein without departing from the essence and gist of the present invention.

The above-described embodiments can be summarized in the following manner.

The control device (12) for the mobile body is equipped with the charging and electrical power supplying unit (16) configured to charge the battery (88) provided in the mobile body using the electrical power supplied from the electrical power source (26) positioned externally of the mobile body (10) via the charging connector (24), and configured to supply electrical power to an electrical load (108A, 108B) supplied from the battery via an electrical power supplying connector (29), the switching unit (41) provided between the charging and electrical power supplying unit and the charging connector, and between the charging and electrical power supplying unit and the electrical power supplying connector, and configured to switch a conductive path between the charging and electrical power supplying unit, the charging connector, and the electrical power supplying connector, the connection determination unit (103) configured to determine whether or not the electrical load (108B) is connected to the electrical power supplying connector, the failure determination unit (104) configured to execute a failure determination to determine a failure of the switching unit based on a conductive state when the conductive path is switched, and the control unit (102) configured to limit execution of the failure determination by the failure determination unit, in the case it is determined by the connection determination unit that the electrical load is connected to the electrical power supplying connector. In accordance with such a configuration, in the case it is determined by the connection determination unit that an electrical load is connected to the electrical power supplying connector, execution of the failure determination by the failure determination unit with respect to the switching unit is limited. Since the failure determination is performed with respect to the switching unit in the case that an electrical load is not connected to the electrical power supplying connector, in accordance with such a configuration, the control device for the mobile body can be provided in which the failure determination with respect to the switching unit can be performed accurately while erroneous detection of electric leakage is prevented.

The electrical power supplying connector may include the mobile body interior electrical power supplying connector (29A to 29C) configured to supply electrical power to the electrical load in the interior of the mobile body, and the mobile body exterior electrical power supplying connector (29D) configured to supply electrical power to the electrical load located at the exterior of the mobile body, the switching unit may be configured to switch the conductive path in a manner so that either the mobile body interior electrical power supplying connector or the mobile body exterior electrical power supplying connector is configured to be made conductive with the charging and electrical power supplying unit, when the failure determination is executed by the failure determination unit, the switching unit may switch the conductive path in a manner so that the mobile body exterior electrical power supplying connector and the charging and electrical power supplying unit are made conductive, and the control unit may limit execution of the failure determination by the failure determination unit, in the case it is determined by the connection determination unit that the electrical load is connected to the mobile body exterior electrical power supplying connector. In accordance with such a configuration, since the conductive path is switched in a manner so that the mobile body exterior electrical power supplying connector and the charging and electrical power supplying unit are made conductive, even if an electrical load is connected to the mobile body interior electrical power supplying connector, current does not flow into the electrical load connected to the mobile body interior electrical power supplying connector. Therefore, in accordance with such a configuration, it is possible to provide the control device for the mobile body which is capable of accurately carrying out a failure determination with respect to a switching unit while preventing erroneous detection of electric leakage.

The switching unit may be equipped with the first switching unit (41A) configured to switch the conductive state between the charging connector and the charging and electrical power supplying unit, and the second switching unit (41B) configured to switch the conductive state in a manner so that, when the first switching unit is switched in a manner so that the charging connector and the charging and electrical power supplying unit become non-conductive, either the mobile body interior electrical power supplying connector or the mobile body exterior electrical power supplying connector is made conductive with the charging and electrical power supplying unit. In accordance with such a configuration, the charging connector, the mobile body interior electrical power supplying connector, and the mobile body exterior electrical power supplying connector can be switched with a simple configuration.

The plurality of first power lines (32A, 32B) may be provided between the charging connector and the charging and electrical power supplying unit, the plurality of second power lines (31A, 31B, 35A, 35B) may be provided between the mobile body interior electrical power supplying connector and the charging and electrical power supplying unit, and between the mobile body exterior electrical power supplying connector and the charging and electrical power supplying unit, the first switching unit may include the plurality of switches (30A, 30B) provided respectively in the plurality of first power lines, the second switching unit may include the plurality of switches (39A to 39C) provided respectively in the plurality of second power lines, and when the failure determination is executed by the failure determination unit, the control unit may control one switch from among the plurality of switches provided in the first switching unit in a manner so as to make one of the first power lines from among the plurality of first power lines conductive with the mobile body interior electrical power supplying connector or the mobile body exterior electrical power supplying connector, and may control one switch from among the plurality of switches provided in the second switching unit in a manner so as to make the one of the first power lines conductive with the mobile body exterior electrical power supplying connector. In accordance with such a configuration, even in the case that the three of the charging connector, the mobile body interior electrical power supplying connector, and the mobile body exterior electrical power supplying connector are provided, it is possible to accurately perform the failure detection with respect to the switching units.

In the case that the failure determination is executed by the failure determination unit with respect to the first switching unit, the control unit may perform the failure determination using the electrical power supplied from the electrical power source positioned externally of the mobile body, and in the case that the failure determination is executed by the failure determination unit with respect to the second switching unit, the control unit may perform the failure determination using the electrical power supplied from the battery. When the failure determination is carried out with respect to the second switching unit, the electrical power supplied from the electrical power source positioned externally of the mobile body is incapable of being supplied to the second switching unit. However, in accordance with such a configuration, when the failure determination is performed with respect to the second switching unit, the electrical power supplied from the battery is used. Therefore, in accordance with such a configuration, it is possible to accurately perform the failure determination with respect to the second switching unit.

Even in the case that the failure determination is executed by the failure determination unit with respect to the first switching unit, and even in the case that the failure determination is executed by the failure determination unit with respect to the second switching unit, the control unit may perform the failure determination using the electrical power supplied from the battery.

The mobile body is equipped with the control device for the mobile body as described above.

In the method of controlling the control device for the mobile body equipped with the charging and electrical power supplying unit configured to charge the battery provided in the mobile body using the electrical power supplied from the electrical power source positioned externally of the mobile body via the charging connector, and configured to supply the electrical power to the electrical load supplied from the battery via the electrical power supplying connector, and the switching unit provided between the charging and electrical power supplying unit and the charging connector, and between the charging and electrical power supplying unit and the electrical power supplying connector, and configured to switch the conductive path between the charging and electrical power supplying unit, the charging connector, and the electrical power supplying connector, the method includes determining (S1) whether or not the electrical load is connected to the electrical power supplying connector, in the determining, in the case it is determined that the electrical load is not connected to the electrical power supplying connector, switching the conductive path between the charging and electrical power supplying unit, the charging connector, and the electrical power supplying connector, and executing (S2) the failure determination to determine a failure of the switching unit based on the conductive state when the conductive path is switched, and in the determining, in the case it is determined that the electrical load is connected to the electrical power supplying connector, limiting (S3) execution of the failure determination.

What is claimed is:

1. A control device for a mobile body, comprising:
    a charging and electrical power supplying unit configured to charge a battery provided in the mobile body using electrical power supplied from an electrical power source positioned externally of the mobile body via a charging connector, and configured to supply electrical power to an electrical load supplied from the battery via an electrical power supplying connector;
    a switching unit provided between the charging and electrical power supplying unit and the charging connector, and between the charging and electrical power supplying unit and the electrical power supplying connector, and configured to switch a conductive path between the charging and electrical power supplying unit, the charging connector, and the electrical power supplying connector; and
    one or more processors that execute computer-executable instructions stored in a memory, wherein the one or more processors execute the computer-executable instructions to cause the control device to:
    execute a connection determination to determine whether or not the electrical load is connected to the electrical power supplying connector;
    execute a failure determination to determine a failure of the switching unit based on a conductive state when the conductive path is switched in response to the connection determination that no electrical load is connected to the electrical power supplying connector; and
    limit execution of the failure determination in response to the connection determination that the electrical load is connected to the electrical power supplying connector,
    wherein the electrical power supplying connector comprises a mobile body interior electrical power supplying connector configured to supply electrical power to an electrical load in an interior of the mobile body, and a mobile body exterior electrical power supplying connector configured to supply electrical power to an electrical load located at an exterior of the mobile body;
    the switching unit is configured to switch the conductive path in a manner so that either the mobile body interior electrical power supplying connector or the mobile body exterior electrical power supplying connector is configured to be made conductive with the charging and electrical power supplying unit;
    when the failure determination is executed, the switching unit switches the conductive path in a manner so that the mobile body exterior electrical power supplying connector and the charging and electrical power supplying unit are made conductive; and
    the one or more processors further cause the control device to limit execution of the failure determination, in a case it is determined that the electrical load is connected to the mobile body exterior electrical power supplying connector.

2. The control device for the mobile body according to claim 1, wherein the switching unit comprises:
    a first switching unit configured to switch a conductive state between the charging connector and the charging and electrical power supplying unit; and
    a second switching unit configured to switch a conductive state in a manner so that, when the first switching unit is switched in a manner so that the charging connector and the charging and electrical power supplying unit become non-conductive, either the mobile body interior electrical power supplying connector or the mobile body exterior electrical power supplying connector is made conductive with the charging and electrical power supplying unit.

3. The control device for the mobile body according to claim 2, wherein:
a plurality of first power lines are provided between the charging connector and the charging and electrical power supplying unit;
a plurality of second power lines are provided between the mobile body interior electrical power supplying connector and the charging and electrical power supplying unit, and between the mobile body exterior electrical power supplying connector and the charging and electrical power supplying unit;
the first switching unit includes a plurality of switches provided respectively in the plurality of first power lines;
the second switching unit includes a plurality of switches provided respectively in the plurality of second power lines; and
when the failure determination is executed, the one or more processors cause the control device to control one switch from among the plurality of switches provided in the first switching unit in a manner so as to make one of the first power lines from among the plurality of first power lines conductive with the mobile body interior electrical power supplying connector or the mobile body exterior electrical power supplying connector and control one switch from among the plurality of switches provided in the second switching unit in a manner so as to make the one of the first power lines conductive with the mobile body exterior electrical power supplying connector.

4. The control device for the mobile body according to claim 2, wherein:
in a case that the failure determination is executed with respect to the first switching unit, the one or more processors cause the control device to perform the failure determination using the electrical power supplied from the electrical power source positioned externally of the mobile body; and
in a case that the failure determination is executed with respect to the second switching unit, the one or more processors cause the control device to perform the failure determination using the electrical power supplied from the battery.

5. The control device for the mobile body according to claim 2, wherein, even in a case that the failure determination is executed with respect to the first switching unit, and even in a case that the failure determination is executed with respect to the second switching unit, the one or more processors cause the control device to perform the failure determination using the electrical power supplied from the battery.

6. A mobile body equipped with the control device for the mobile body according to claim 1.

* * * * *